(12) United States Patent
Wang

(10) Patent No.: US 10,008,312 B2
(45) Date of Patent: Jun. 26, 2018

(54) MAGNETIC CORE FOR TRANSFORMER

(75) Inventor: Baojun Wang, Guangzhou (CN)

(73) Assignee: MORNSUN GUANGZHOU SCIENCE & TECHNOLOGY LTD., Guangdong (CN)

( * ) Notice: Subject to any disclaimer, the term of this patent is extended or adjusted under 35 U.S.C. 154(b) by 0 days. days.

(21) Appl. No.: 14/356,886

(22) PCT Filed: Mar. 20, 2012

(86) PCT No.: PCT/CN2012/072656
§ 371 (c)(1),
(2), (4) Date: Jul. 31, 2014

(87) PCT Pub. No.: WO2013/091315
PCT Pub. Date: Jun. 27, 2013

(65) Prior Publication Data
US 2014/0354384 A1 Dec. 4, 2014

(30) Foreign Application Priority Data
Dec. 22, 2011 (CN) .......................... 2011 1 0436359

(51) Int. Cl.
| | |
|---|---|
| *H01F 17/04* | (2006.01) |
| *H01F 17/06* | (2006.01) |
| *H01F 3/00* | (2006.01) |
| *H01F 3/14* | (2006.01) |
| *H02M 3/338* | (2006.01) |
| *H01F 30/16* | (2006.01) |
| *H01F 27/24* | (2006.01) |

(52) U.S. Cl.
CPC ................. *H01F 3/00* (2013.01); *H01F 3/14* (2013.01); *H02M 3/338* (2013.01); *H01F 27/24* (2013.01); *H01F 30/16* (2013.01)

(58) Field of Classification Search
CPC ... H01F 3/14; H01F 3/00; H01F 30/16; H01F 27/24; H01F 17/06; H01F 17/062
USPC .................................. 336/178, 229, 160, 165
See application file for complete search history.

(56) References Cited

U.S. PATENT DOCUMENTS 2,149,634 A * 3/1939 Schweitzer, Jr. ............... 361/35
3,143,686 A * 8/1964 Vonderschmitt ........ H01F 38/42
 315/406
4,305,056 A * 12/1981 Mochida .................. H01F 3/14
 29/606

(Continued)

*Primary Examiner* — Mangtin Lian
(74) *Attorney, Agent, or Firm* — JCIPRNET

(57) ABSTRACT

A magnetic core for a transformer, which includes a closed ring with a thick part and a thin part. The thin part is magnetically saturated before the thick part when excited by the same increasing magnetic fields. The thin part only operates briefly at or near first quadrant saturation point or a third quadrant saturation point and, for the rest of the time, it operates in a state between the first quadrant saturation point and the third quadrant saturation point. The present invention overcomes the drawbacks of the conventional magnetic core for a self-excitation push-pull type converter, and significantly improves the efficiency of the converter when it is under a light load, and further improves its efficiency while under a rated load. As the number of turns of the coil on the magnetic saturation transformer is reduced, the working frequency of the converter is improved while still keeping the loss low.

9 Claims, 8 Drawing Sheets

(56) References Cited

U.S. PATENT DOCUMENTS

| | | | | |
|---|---|---|---|---|
| 4,969,078 A | * | 11/1990 | Yamamoto | H02M 3/3378 336/178 |
| 5,506,764 A | * | 4/1996 | Hon | H01F 3/14 336/178 |
| 6,982,623 B2 | * | 1/2006 | Satou et al. | 336/178 |
| 2006/0103496 A1 | * | 5/2006 | Lee | 336/178 |
| 2009/0027151 A1 | * | 1/2009 | Nakatsu et al. | 336/212 |
| 2012/0194313 A1 | * | 8/2012 | Wohlforth | H01F 27/38 336/170 |

* cited by examiner

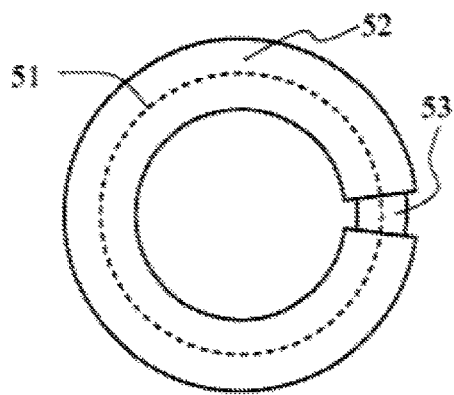
FIG. 13-1    FIG. 13-2
FIG. 13-3
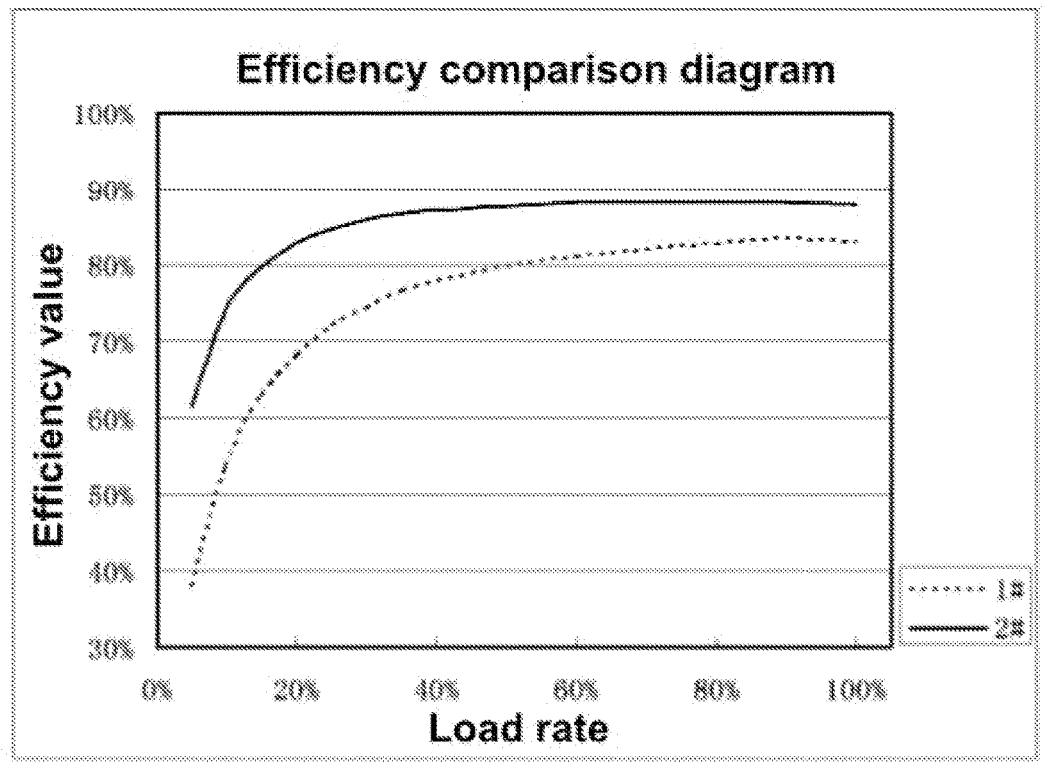
FIG. 14

MAGNETIC CORE FOR TRANSFORMER

FIELD OF THE INVENTION

This invention is related to a magnetic core for transformer, especially the transformer magnetic core for use in power source converters.

BACKGROUND OF THE INVENTION

In the existing self-excitation push-pull converters and the transformers used in them, the circuit structure is based on the DC converter of self-excitation push-pull transistor single transformer invented by G. H. Royer in the United States in 1955, it is also referred to as Royer circuit, which is the start to realize high frequency conversion control circuit; some circuits are based on the self-excitation push-pull dual transformer circuit of Jensen of the United States in 1957, which was later known as self-excitation Jensen circuit or Jensen circuit; both of these circuits were later referred to as self-excitation push-pull converter. The self-excitation push-pull converter is described on pp. 67~70 of *Principle and design of switching power source* published by the Electronic Industry Press, the ISBN No. of the book is 7-121-00211-6. The circuits are mainly in the forms of the above-mentioned famous Royer circuit and self-oscillating Jensen circuit.

Shown in FIG. 1-1 is a common application of the self-excitation push-pull converter, it is based on Royer circuit; shown in FIG. 1-2 is the famous self-oscillating Jensen circuit; in FIG. 1-1 and FIG. 1-2, the circuits oscillate by using the magnetic core saturation characteristics of transformer B1, in the Jensen circuit of FIG. 1-2, the self-oscillating frequency and drive function of the circuit is realized by the magnetic saturated transformer B1, therefore, the main power transformer B2 can work in a non-saturated state.

The oscillation frequency of the Royer circuit is a function of the power source voltage, which is described in Line 18 on p. 68 of *Principle and design of switching power source* published by the Electronic Industry Press, the ISBN No. of the book is 7-121-00211-6. It is quoted as follows:

$$f = \frac{V_S}{4BwSN} \times 10^4 \text{Hz} \quad \text{Formula (1)}$$

where: f is the oscillation frequency; BW the working magnetic induction intensity (T), normally taken as 50%~70% of the magnetic saturation point $B_m$ value; N is the No. of coil turns; S the magnetic core effective sectional area; and $V_S$ the working power source voltage.

To better understand the working principle of the Royer circuit, especially the oscillation with magnetic core saturation characteristics, its working principle is described with FIG. 1-1 as an example.

The circuit in FIG. 1-1 is in such a structure: the input filtering capacity C is connected between the voltage input and ground, to filter the input voltage; the input voltage after filtration is connected to the start circuit, which is formed by the shunted biasing resistor R1 and capacitor C1, the two ends of the biasing resistor R1 are respectively connected with the voltage input and the central taps of the primary side coils $N_{B1}$ and $N_{B2}$ of transformer B1 which provides positive feedback to the bases of the two push-pull transistor TR1 and TR2, the emitters of the two push-pull transistor TR1 and TR2 share a ground, the two collectors are respectively connected to the two ends of the transformer primary side coils $N_{P1}$ and $N_{P2}$, the bases are connected to the two ends of the transformer primary side coils $N_{B1}$ and $N_{B2}$, and the central taps in the primary side coils $N_{P1}$ and $N_{P2}$ are connected to the voltage input; the secondary side coil NS of transformer B1 connects the output circuit to the voltage output.

The working principle can be briefly described as: refer to FIG. 1-1, at the moment when the power is turned on, the shunted circuit of biasing resistor R1 and capacitor C1 provides a forward bias for the base and emitter of the transistors TR1 and TR2 via windings $N_{B1}$ and $N_{B2}$, the two transistors TR1 and TR2 start to conduct, as the characteristics of the two transistor cannot be completely the same, one of them will become conducting first, suppose transistor TR2 becomes conducting first, and produces the collector current IC2, the voltage in the corresponding $N_{P2}$ winding is positive at the top and negative at the bottom, according to the dotted terminal relationship, an induced voltage positive at the top and negative at the bottom will also appear at its base coil $N_{B2}$, this voltage increases the base current of transistor TR2, which is a forward feedback process, therefore it quickly makes transistor TR2 saturated and conducting; similarly, the voltage of the coil $N_{B1}$ corresponding to transistor TR1 is positive at the top and negative at the bottom, and it reduces the base current of transistor TR1, so that this transistor is soon completely cut off.

The current in coil $N_{P2}$ winding corresponding to transistor TR2 and the magnetic induction intensity produced by this current increases linearly with time, but when the magnetic induction intensity increases to approach or reach the saturation point $B_m$ of the transformer B1 magnetic core, the induction in the $N_{P2}$ will decrease quickly, resulting in sharp increase of the collector current of transistor TR2 switching tube, at a rate much higher than the increasing rate of base current, the transistor TR2 switching tube becomes unsaturated, the voltage drop Uce across the collector and emitter of transistor TR2 switching tube increases, correspondingly, the voltage on transformer $N_{P2}$ winding reduces by the same value, and the voltage induced in coil $N_{B2}$ winding reduces, resulting in reduction of the base voltage of transistor TR2 switching tube, so that transistor TR2 switching tube changes in the direction of cut-off, at this moment, the voltage in the coil of transformer B1 will reverse, to make the other transistor TR1 conduct, and after that, this process is repeated, to form push-pull oscillation. The waveform at the winding Ns output end is as shown in FIG. 2, it can be seen that except the "collector resonance Royer circuit" that outputs sinusoidal wave or approximate sinusoidal wave, the working waveform of the self-excitation push-pull converter is close to a square wave. The collector resonance Royer circuit is also called "cold cathode fluorescent lamp inverter", referred to as CCFL inverter or CCFL converter, the CCFL converter is connected in series an inductor with a inductance over ten times that of the main power winding in the power supply circuit, to obtain an output of sinusoidal wave or approximate sinusoidal wave. FIG. 3 is the square hysteresis loop of the transformer B1 magnetic core, where $+B_m$, $-B_m$ are the two magnetic saturation points of the magnetic core, $+B_m$ is referred to as the first quadrant saturation point, because the $+B_m$ of this point falls in the first quadrant of the coordinates in FIG. 3, and $-B_m$ is the third quadrant saturation point, in the half cycle of FIG. 2, the moving line of the working point of transformer B1 magnetic core is ABCDE, and its moving line in the next half cycle is EFGHA. In fact, when the current in the winding corresponding to transistor TR2 or TR1, and the magnetic induction intensity produced by this current increase linearly with time to point D or H in FIG. 3, the circuit will perform push-pull conversion, i.e. when a transistor conducts, the corresponding transistor will cut off, as transistors have a storage time, that is, after the transistor base has received a cutting off signal, the collector current will drop with a time delay till cut-off, the storage time can occur in FIG. 3, the moving line of the magnetic core working point will move from point D to E, correspondingly, the moving line of the magnetic core working point will move from point H to A, and during this moving process, the hysteresis of the magnetic core will uselessly increase the transistor collector current, resulting in loss.

Its feature is: push-pull oscillation is conducted by using the saturation characteristics of the magnetic core, the transformer output waveform is approximate square wave, and the circuit conversion efficiency is fairly high. As the magnetic core should become nearly saturated at the specific time moment, a magnetic core with air gap cannot be used. A self-excitation push-pull converter must use a magnetic saturated magnetic core, and magnetic core plus air gap is a generally known means to resist magnetic saturation.

In this literature, magnetic core, as in other generally known literatures, refers to a ferrite material, i.e. a sintered magnetic metal oxide of the mixture of various ferrite oxides, and magnetic cores are mostly used in high frequency applications. Iron cores are made of silicon sheet material and are suitable only for low frequency inductance lines and LV transformer, and are normally used in low frequency and voice frequency applications.

A structure similar to that shown in FIG. 1-2 is a circuit with the switch drive function separated from the main power transformer. As described above, the self-oscillating frequency and drive function of the circuit will be realized by the magnetic saturated transformer B1, therefore, the main power transformer B2 can work in a non-saturated state. Although magnetic saturation occurs at B1, the magnetic saturation consumes very small amount of energy because of the small volume of B1, and under the identical conditions, the overall efficiency of the Jensen circuit is omitted.

The above-mentioned self-excitation push-pull converter has the following four disadvantages due to magnetic saturation in its magnetic core:

1. The Converter Efficiency is Low with Light Loads.

As the Royer circuit performs push-pull oscillation by using the saturation characteristics of the magnetic core, its no-load working current cannot be too low, and Table 1 shows the measured parameters of the Royer circuit. If a circuit as shown in FIG. 1-1 is used to make a converter with input DC at 5V, output DC at 5V and output current of 200 mA, i.e. with an output power of 1 W. Downstream the transformer, the output is in the circuit structure as shown in FIG. 4, which is a generally known full-wave rectifying circuit, both D41 and D42 are RB160 Schottky diodes. The main parameters of the circuit are: the capacitor C is 1 uF, resistor R1 is 1KΩ, capacitor C1 is 0.047 uF, and TR1 and TR2 are switching transistors with magnification factor of about 200, with its maximum collector working current being 1 A; the primary side coils $N_{P1}$ and $N_{P2}$ have respectively 20 turns, feedback coils $N_{B1}$ and $N_{B2}$ respectively 3 turns, secondary side coils $N_{S1}$ and $N_{S2}$ respectively 23 turns, and the magnetic core is a common ferrite loop magnetic core with an outer diameter of 5 mm and sectional area of 1.5 mm², with the common name magnetic loop, and its 3D profile view is as shown in FIG. 5.

In actual measurement, the circuit has a no-load working current of 18 mA, its working frequency is 97.3 KHz, close to 100 KHz, for the conversion efficiency test, the circuit as shown in FIG. 6 was used, VI voltmeter reading is working voltage Vin, i.e. the input voltage; A1 ammeter head is input current Iin, i.e. the working current; V2 voltmeter reading is output voltage Vout, and A2 ammeter reading is the output current Iout; so the conversion efficiency can be calculated using formula (2).

The conversion efficiency of the circuit is:

$$\eta = \frac{Vout \times Iout}{Vin \times Iin} \times 100\% \qquad \text{Formula (2)}$$

where: Vin is working voltage, i.e. the input voltage, Iin is input current; Vout is output voltage, and Iout is output current. In the test, the wiring method as shown in FIG. 6 is used, with RL as the variable load, to effectively reduce the measuring error. Both ammeter and voltmeter are model MY65 4½ digital universal meters set at steps 200 mA and 20V or 200V, and four and more universal meters were used at the same time.

When the model MY65 4½ digital universal meter is used to measure voltage, the internal resistance is 10 MCI, and is 1Ω at the 200 mA current step. When the current exceeds 200 mA, two ammeters are used and set at 200 mA to measure it in parallel, and the sum of the current readings of the two meters is the measured value. Measurement using ammeters connected in parallel is a mature existing technology in electronic engineering.

When the circuit as shown in FIG. 1-1 is used and the above-mentioned parameters are set, with the output current at 5% of 200 mA, or 10 mA and a working frequency of 97.3 KHZ, the measured parameters are as shown in Table 1 below.

TABLE 1

| Input current Iin | Input voltage Vin | Output current Iout | Output voltage Vout | Efficiency (Calculated value) |
|---|---|---|---|---|
| 28.4 mA | 5.060 V | 9.96 mA | 5.487 V | 38.03% |

It can be seen from the table above that, when the output is 5% of full load, the efficiency is only 38.03%, which is highly representative in the low power module power sources presently in the art.

With the Jensen circuit as shown in FIG. 1-2, although a small transformer B1 is used to realize magnetic saturation while the main power transformer B2 works in a non-saturated state, in an attempt to increase the efficiency, in fact, the use of two transformer results in an additional element to produce loss, and the design of the small transformer B1 should take into account the output power of the whole circuit, after careful commissioning, at 5V output, the no-load current of the Jensen circuit outputting 5V/200 mA is reduced to 16 mA, and when the output is only 5% of full load, the efficiency increases a little from that of the above-mentioned Royer circuit, to 40.91%.

2. For Rated Load, it is Impossible to Further Increase the Efficiency.

With the self-excitation push-pull converter, take the Royer circuit as an example, as each push-pull operation of the circuit is realized when approaching or at magnetic saturation of the magnetic core, and the energy consumed by magnetic saturation is lost in the form of heat, therefore, to increase the conversion efficiency of the circuit, the working frequency of the converter should be reduced, it can be seen from formula (1) that, with the input voltage remaining unchanged, it can be achieved only by increasing the value of the denominator in the formula, i.e. increasing the magnetic induction intensity Bw, or increasing the number of coil turns N, or increasing the effective sectional area S of the magnetic core. In converter products today, magnetic cores with extremely high working magnetic induction intensity Bw have been selected, the number of coil turns N increased, resulting in increased use of copper, the increase of the effective sectional area S of magnetic core also increases the loss each time when it approaches or enters the magnetic core magnetic saturation, thus reducing instead of increasing the conversion efficiency of the converter. Therefore, in the design of a self-excitation push-pull converter, it is quite difficult to select between these parameters.

To increase the conversion efficiency of the Jensen circuit, for the similar reasons, if the effective sectional area S of the magnetic core of the small transformer B is too small, the pushing power will be insufficient, the switching transistor cannot become well saturated and conducting, resulting in increased voltage drop loss and reduced converter conversion efficiency, when the effective sectional area S of the magnetic core of the small transformer B1 is taken too high, the self-loss will also be high; the problem can be solved by increasing the number of turns of the coil, but it also results in the following issue: with increased number of turns, as the small transformer B1 must work under magnetic saturation state and no air gap can be made, it will make the winding highly difficult.

3. When the Input Voltage is High, there are Many Turns on Transformer B1, Making the Processing Quite Difficult.

In a self-excitation push-pull converter, taking the Royer circuit as an example, it can be seen from formula (1) that, when the input voltage increases, if the working frequency of the self-excitation push-pull converter remains unchanged, the corresponding parameter of the denominator in formula (1) should be increased, and for industrial class small module power sources of the same series and same power, magnetic cores of the identical size are often used. In this case, the problem can be solved only by increasing the number of coil turns N, for example, with the circuit parameters shown in FIG. 1-1, if a product with input of 24V is made, the number of turns in the primary side coils $N_{P1}$ and $N_{P2}$ should be increased from 20 each for 5V to 96 each, as the transformer B1 in FIG. 1-1 must work in a magnetic saturated status and no air gap is permissible, it is quite difficult to wind the coil, at present, it is quite difficult to wind so many turns of enameled wire on a small magnetic ring with a diameter less than 10 mm, either with a machine or manually. When a machine is used, when the first layer is finished, it is quite difficult to wind the second layer on the first one, as it will break the wire sequence of the first layer, and the winding will be made worse and worse; in manual winding, it is quite difficult to avoid one or two turns more or less as the number of turns must be memorized entirely by workers, if the number of turns is different, deviation will occur in the output voltage, and in a serious case, the original function cannot be realized when the transformer is installed.

If the effective sectional area S of the magnetic core is doubled, the number of turns can be reduced to 48, but in this case, as the effective sectional area S of the magnetic core of transformer B1 is doubled, at the same frequency, the self loss will also double, so the converter conversion efficiency will be reduced.

Therefore, in the industrial field and market today, it is difficult to find self-excitation push-pull converter modules with working voltage of 48V and over, and also for this reason, the efficiency has to be reduced for less number of turns.

4. It is Difficult to Increase the Working Frequency.

As the self-excitation push-pull converter circuit performs each push-pull operation by approaching or reaching magnetic saturation of the magnetic core, therefore, when the working frequency increases, its loss will increase and conversion efficiency reduce.

To the Jensen circuit, for the similar reason, the effective sectional area S of the magnetic core of the small transformer B1 become smaller, for a 24V input voltage, it often requires to have 60 turns on the primary side, as there is only one primary side coil, it can be wound with two wires in parallel for only 30 turns, and then they can be connected in parallel as 60 turns, but the small transformer B1 has a smaller diameter, it is quite difficult to wind it either with a machine or manually. For a 48V input voltage, it is almost impossible to make a small transformer B1. Similarly, if the effective sectional area S of the magnetic core is doubled, there can be less turns, but at the same working frequency, the self-loss will double and the conversion efficiency of the converter will reduce.

In patent CN101290828, an iron core structure with unequal sectional area working in magnetic saturated area is shown, for either the input or output winding on the working section, similar to the AC magnetic saturation stabilizers extensively used in household and industrial application at the end of 1970s, they can only work in sinusoidal wave or sinusoidal wave with small distortion, unable to overcome the above-mentioned disadvantage existing with the self-excitation push-pull converter. For the deficiency of that patent, please refer to p. 174 of the *Design of Switching Power* published by the Electronic Industry Press:

The ISBN No. of the book is 7-121-01755-5, there is a detailed description in the last paragraph on that page, "it should be pointed out that, the surface radiating area of most iron cores made with laminated sheets is very small, therefore the thermal resistance is high, about 40~100° C./W. Unless they are fixed on radiators, their total loss must be maintained below 1 W"; Table 6.3 on p. 174 of that book also indicates very high iron core loss, at the working frequency of 100 kHz, the Toshiba MB material has the minimum iron core loss, which is 1.54 W/cm$^3$, that is, at the working frequency of 100 kHz, the inherit loss of this type of iron core is 1.54 W per cubic centimeter, which is unacceptable in the small power module power source in industrial applications; at 50 KHz, the loss is relatively small, as mentioned above, the self-excitation push-pull converter has a working waveform close to square wave, the rising edge of the square wave is a step signal, when it is unfolded by Fourier transform, its frequency can be over 20 times the base frequency, that is 50 KHz×20=1 MHz, at this moment, this type of iron core will have a very high loss, the base frequency is the working base frequency of the self-excitation push-pull converter, the frequency of the square wave in FIG. 2.

In fact, there is a note in the third paragraph on p. 174 of that book: "the material is usually be made in a thin strap, and coiled into a cylinder". This coiling technology is extensively used in ring transformers for power frequency, with the purpose to obtain iron cores without air gap. It is extremely difficult to make a ring iron cores with a diameter less than 10 mm with strap laminating sheets, therefore in this case, people choose to make magnetic cores with magnetic powder through moulding and sintering, at the working frequency of 100 KHz, the magnetic core loss is about several dozen to several hundred mW/cm$^3$, much lower comparatively, please refer to the parameters for the 100 KHz part on Table 7.1 on p. 184 of the *Design of Switching Power* published by the Electronic Industry Press.

Note: power frequency refers to the 50 Hz or 60 Hz frequency of AC power source for industrial applications. For the principles of the AC magnetic saturation stabilizers extensively used in household and industrial applications at the end of 1970s, refer to periodicals such as *Electronic World and Radio* published in early 1980s.

In the Patent JP60032312A published on Feb. 19, 1985, a magnetic core for choke coil was presented, which was aimed to solve the same problem as that to be solved by the choke coil presented in the Patent JP62165310A published on Jul. 21, 1987, it can obtain a fairly high inductance with a small current, but relatively low inductance with a large current, so that it can improve the output ripple of the switching power in intermittent mode when it is used as a flyback inductor in a switching power, when a small current is output, the switching power works in an intermittent mode (DCM), and the flyback inductor can obtain a relatively high inductance with these two patents, in this way, the working mode of the switching power can transfer towards a continuous mode (CCM), the current flowing through the inductor is reduced, but lasts a longer time as it has become smaller, this can improve the output ripple, which is a generally known technology in the industrial circle; it can also be seen from the figures (FIG. 5 of Patent JP60032312A and FIG. 2 of Patent JP62165310A) in these two published documents that, Both patented technologies have the disadvantages that cannot be overcome with the self-excitation push-pull converter as described above, and these disadvantages are caused by the magnetic saturation existing in the transformer magnetic cores used in such converters.

SUMMARY OF THE INVENTION

Therefore, the technical issue to be solved by this invention is to overcome the disadvantages of the existing magnetic cores used in self-excitation push-pull converters, so that the efficiency of the self-excitation push-pull converter can be substantially improved when the converter is used with light loads; its efficiency can be further improved when used at rated load, the number of turns of the coils on the magnetic saturated transformers in the self-excitation push-pull converter can be reduced; and the working frequency of the self-excitation push-pull converter can be increased while maintaining its loss at a relatively low level.

To solve these technical issues, this invention provides a magnetic core for transformer, the magnetic core comprising a closed ring with a thick part and a thin part, the thin part can reach magnetic saturation before the thick part with the same increasing magnetic field excitation. In operating, the thin part only operates briefly at or near first quadrant saturation point or a third quadrant saturation point and, for the rest of the time, it operates in a state between the first quadrant saturation point and the third quadrant saturation point. One or more thin parts may be used.

Preferably, the said thin part has a length of over 0.05 mm, less than one eighth of the total magnetic path length, with a sectional area below 80% and above 4% of the sectional area of the thick part. More preferably, the sectional area of the thin part is below 50% and above 6.25% of the sectional area of the thick part. Relative to the thick part, the smaller the sectional area of the thin part, the shorter its length should be in order to ensure the mechanical strength of the thin part.

Preferably, the said thick part and thin part are made of the same materials.

Preferably, there is a transition section between the said thick part and thin part, to facilitate demoulding after magnetic powder moulding of the magnetic core.

Preferably, on the said thick part there are two or more salient points, to prevent wires on the thick part from sliding onto the thin part, or to locate different windings in given areas to prevent them from intersecting with each other.

This invention also provides a transformer wound on the said magnetic core, with the said thick part wound with a coil, but no coil on the said thin part.

The working principle of this invention: the said technical plan is applied in the self-excitation push-pull converter, take the Royer circuit in FIG. 1-1 as an example, the transformer B1 in the self-excitation push-pull converter in FIG. 1-1 is based on the technical plan of this invention as described above, there is no change in the push-pull working principle of the circuit, and when transistor TR2 becomes saturated and conduct, correspondingly, transistor TR1 completely cuts off, the current in transistor TR2 corresponding coil $N_{P2}$ winding and the magnetic induction intensity produced by this current increases linearly with time, but when the magnetic induction intensity increases to the saturation point $B_m$ of the transformer B1 magnetic core, the inductance in the coil will decrease quickly, resulting in sharp increase of the collector current of transistor TR2 switching tube, at a rate much higher than the increasing rate of base current, the transistor TR2 switching tube becomes unsaturated, the voltage drop Uce across the collector and emitter of transistor TR2 switching tube increases, correspondingly, the voltage on transformer $N_{P2}$ winding reduces by the same value, and the voltage induced in coil $N_{B2}$ winding reduces, resulting in reduction of the base voltage of transistor TR2 switching tube, so that transistor TR2 switching tube changes in the direction of cut-off, at this moment, the voltage in the coil of transformer B1 will reverse, to make the other transistor TR1 conduct, and after that, this process is repeated, to realize push-pull oscillation.

The energy loss occurs mainly when the magnetic induction intensity has increased to the saturation point $B_m$ of the magnetic core of transformer B1, in the existing technology, a magnetic core of the same sectional area is used, basically the whole magnetic core will reach the saturation point $B_m$, and more energy will be required to reach saturation. As shown in FIG. 3, in the first half cycle, the moving line of the working point of transformer magnetic core is ABCDE, and its moving line in the next half cycle is EFGHA, that is, in a full cycle, the working area of the magnetic core with the existing technology is the whole area, as shown in shadow 71 in FIG. 7.

But in this invention, there is a small thin part with a sectional area different from that of the magnetic core in the existing technology, the thin part, excited by an identical increasing magnetic field, reaches magnetic saturation before the thick part, but as it has a very small length, this small thin part of magnetic core reaching its own saturation point $B_m$ can also start the push-pull oscillation of the circuit, the working area of the magnetic core of this thin part covers the whole area, identical to shadow 71 in FIG. 7, but the thin part is very short and the consumed energy can be reduced substantially, the thick part can contain more magnetic lines because of an area bigger than that of the thin part, at the moment when the thin part approaches the magnetic saturation, the thick part is not working in a saturated status, the corresponding magnetic core working area is significantly smaller as shown by shadow 81 in FIG. 8, therefore the thick part consumes very little energy, and the total energy consumed by the magnetic core in this invention is reduced substantially. The magnetic core of this invention can reduce the energy consumption in each push-pull conversion, at the same working frequency, the consumption of the self-excitation push-pull converter circuit of the magnetic core in this invention can be reduced, demonstrated as a reduction of no-load working current of the circuit. For the same reason, the working frequency of the self-excitation push-pull converter can be increased without much increase of loss, so that the conversion efficiency will not reduce at high frequency.

As described above, at the same working frequency, the no-load working current of the self-excitation push-pull converter circuit will reduce correspondingly, i.e. the no-load loss can reduce in the same proportion, accordingly. Similarly, the efficiency of the converter will increase substantially at low-load as well as in the entire working range from low load to full load.

On the basis of the above principle, as it is not necessary for the thick part to work between the two saturation points, the sectional area of the thick part can be increased, so that the inductance per turn will increase in proportion to the increase of sectional area. Thus, the total number of turns can be reduced correspondingly to realize the same inductance, so that the number of turns of the coil of transformer B1 in the self-excitation push-pull converter can be reduced, to realize the purpose of this invention. The detailed working principle and formula derivation will be demonstrated in the embodiments.

In existing technology, magnetic cores of equal sectional area are used, increasing the sectional area will increase the no-load working current due to increased magnetic saturation loss, so the conversion efficiency of the self-excitation push-pull converter will remain unchanged and even reduce somewhat at full load, and in low load, because of high loss, the conversion efficiency reduces seriously. All patent plans mentioned in the background technology must have the whole or part of the core or iron core in a stable magnetic saturation status, and they realize the purpose of invention by means of stable magnetic saturation, for instance, an AC magnetic saturation stabilizer can obtain a stable AC voltage output, the choke coil mentioned in the background technology can obtain a high inductance with a small current, but a relatively low inductance with a large current, the choke inductor will realize linear reduction of inductance with the increase of current by using stable magnetic saturation over a very large working range, both the AC magnetic saturation stabilizer and choke inductor produce very high loss, because they work after magnetic saturation, the magnetic saturation duration accounts for a fairly long period in a cycle, even over one half of a cycle. But in this invention, only a very short thin part is used to realize magnetic saturation in a small part to start the push-pull oscillation of the circuit, magnetic saturation only occurs at a brief moment, and it is almost impossible to accurately measure its duration, as shown in FIG. 7, because in this invention, only the thin part works in the shadow area 71 of FIG. 7. As the thin part is short, the working area of the magnetic core in this thin part moves from point D to E, resulting in the hysteresis effect of the magnetic core along with useless increase of transistor collector current, to produce loss. However, as the thin part is short, the hysteresis effect is small in this process, therefore the loss is reduced. As the thin part is short and the hysteresis is relatively low, it takes less time for the working area of the magnetic core of this thin part to move from point D to E, that is, in this invention, the time for the thin part in the magnetic core to approach or reach the saturation point is shorter. That is, in operating, the thin part only stays at or near the saturation points briefly and for most of the time it stays in a status between the first quadrant saturation point and third quadrant saturation point.

As mentioned above, this invention is aimed to reducing the negative effect from magnetic saturation, which is the essential difference from the existing technology.

When two or more thin parts in the magnetic core are used according to this invention, if the sectional area of the thin parts is equal, it is a functional equivalent to a single thin part consisting of several parts connected in serial. Its working principle is the same as described above.

If the sectional areas of the thin parts are not equal, the thin part with the smallest sectional area will play its role, and other thin parts will not become magnetic saturated internally and thus not participate in the work. As the sectional area of these non-participating thin parts is smaller than that of the thick part, they will reduce the inductance of the coil on the whole magnetic core. Its working principle is similar to the principle described above.

As compared with existing technologies, this invention has the following substantial effect:
(1) It can substantially improve the efficiency of the self-excitation push-pull converter when working with low load.
(2) The conversion efficiency can be further increased at rated load and in the whole working range from no-load to full load; that is, the input power consumption is reduced.
(3) It can reduce the number of turns of the coil of transformer B1 in the self-excitation push-pull converter.
(4) It can increase the winding efficiency of the transformer for self-excitation push-pull converter in the manufacturing process.
(5) It can make possible self-excitation push-pull converter with an input voltage of 48V and over, and only with a simple process.
(6) It can reduce the working current of self-excitation push-pull converter during no-load.
(7) It can increase the working frequency of the self-excitation push-pull converter.
(8) It can realize high efficiency micro power DC/DC module power up to 100 mW.

BRIEF DESCRIPTION OF THE DRAWINGS

FIG. 1-2 is a common application circuit diagram of the Jensen circuit of self-excitation push-pull converter;

FIG. 2 is the output side waveform diagram of the Royer circuit winding Ns in FIG. 1-1;

FIG. 9-1 is the front view of the magnetic core in embodiments 1 to 3 of this invention;

FIG. 9-2 is the side view of the magnetic core in embodiments 1 to 3 of this invention;

FIG. 9-3 is the top view of the magnetic core in embodiments 1 to 3 of this invention;

FIG. 9-4 is the 3D view of the magnetic core in embodiments 1 to 3 of this invention;

FIG. 10-1 is the schematic diagram of the magnetic path $l_w$ in the thick part of embodiments 1 to 3 of this invention;

FIG. 10-2 is the schematic diagram of the magnetic path $l_t$ in the thin part of embodiments 1 to 3 of this invention;

FIG. 11-1 is the front view of the magnetic core for comparison with the existing technology;

FIG. 11-2 is the side view of the magnetic core for comparison with the existing technology;

FIG. 11-3 is the top view of the magnetic core for comparison with the existing technology;

FIG. 13-1 is the front view of the magnetic core in embodiment 4 of this invention;

FIG. 13-2 is the side view of the magnetic core in embodiment 4 of this invention;

FIG. 13-3 is the top view of the magnetic core in embodiment 4 of this invention;

FIG. 14 is the efficiency comparison diagram of embodiment 4 of this invention with the magnetic core of existing technology fitted into circuit;

FIG. 15-1 is the front view of the magnetic core in embodiment 5 of this invention;

FIG. 15-2 is the side view of the magnetic core in embodiment 5 of this invention;

FIG. 15-3 is the top view of the magnetic core in embodiment 5 of this invention;

FIG. 15-4 is the 3D view of the magnetic core in embodiment 5 of this invention;

FIG. 16-1 is the front view of the magnetic core in embodiment 6 of this invention;

FIG. 16-2 is the side view of the magnetic core in embodiment 6 of this invention;

FIG. 16-3 is the top view of the magnetic core in embodiment 6 of this invention;

FIG. 16-4 is the 3D view of the magnetic core in embodiment 6 of this invention;

FIG. 17-1 is the front view of the magnetic core in embodiment 7 of this invention;

FIG. 17-2 is the side view of the magnetic core in embodiment 7 of this invention;

FIG. 17-3 is the top view of the magnetic core in embodiment 7 of this invention;

FIG. 17-4 is the 3D view of the magnetic core in embodiment 7 of this invention;

FIG. 18-1 is the front view of the magnetic core in embodiment 8 of this invention;

FIG. 18-2 is the side view of the magnetic core in embodiment 8 of this invention;

FIG. 18-3 is the top view of the magnetic core in embodiment 8 of this invention;

FIG. 18-4 is the 3D view of the magnetic core in embodiment 8 of this invention;

FIG. 19-1 is the front view of the magnetic core in embodiment 9 of this invention;

FIG. 19-2 is the side view of the magnetic core in embodiment 9 of this invention;

FIG. 19-3 is the top view of the magnetic core in embodiment 9 of this invention;

FIG. 19-4 is the 3D view of the magnetic core in embodiment 9 of this invention;

EMBODIMENTS

Embodiment 1

Figure 1:
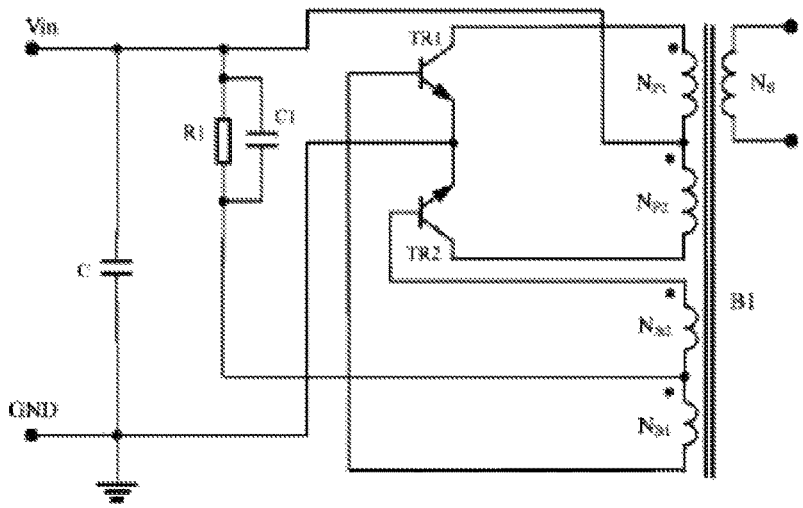
FIG. 1-1 is a common application circuit diagram of the Royer circuit of self-excitation push-pull converter.
Figure 4:
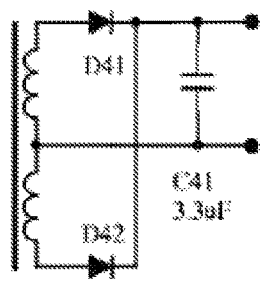
FIG. 4 shows a generally known full-wave rectifying circuit.
Figures 1, 9:
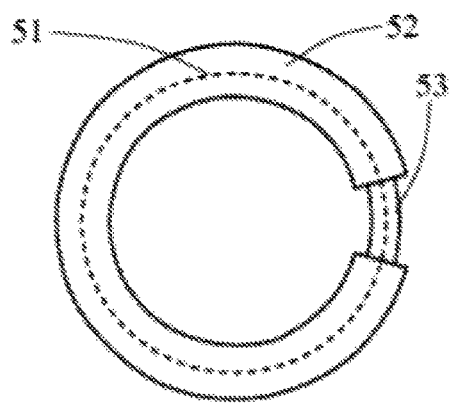
Figures 2, 9:
Figures 3, 9:
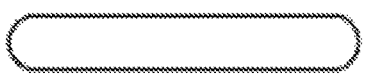
Figures 4, 9:
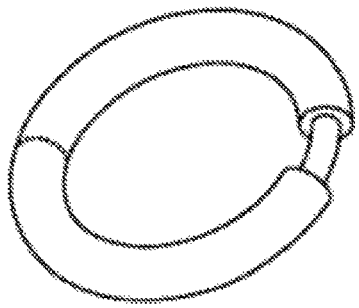

FIGS. 9-1 to 9-4 show the magnetic core of embodiment 1 of this invention, the magnetic core is a magnetic ring of closed magnetic path without air gap, the ring is in cylindrical shape, comprising a thick part and a thin part of the same material, the thin part has a length of over 0.05 mm, and less than one eighth of the total magnetic path length; and the sectional area of the thin part is below 80% and above 4% of the sectional area of the said thick part.

Figure 5:
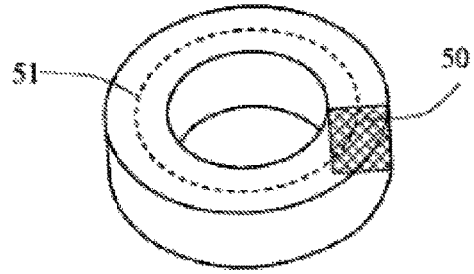
FIG. 5 is the ring type magnetic core of the existing technology.

To clearly demonstrate the effect of this embodiment, in embodiment 1 of this invention, the thick part has the same sectional area as that of the magnetic core in the existing technology, and the sectional area of the thin part is smaller than that of the magnetic core in the existing technology. The ratio of the thick part sectional area to thin part sectional area is the reciprocal of the percentage points in the technical plan, denoted as constant k, as the reciprocal of the above-mentioned "below 80% and above 4%", it is 1.25 times to 25 times, FIG. 5 shows the ring type magnetic core of the existing technology, with a uniform sectional area 50 as shown, then, according to the existing generally known technology, the inductance of the coil wound over it is:

$$L = \frac{4\pi \times \mu i \times Ae \times N^2}{l_e} \quad \text{Formula (3)}$$

where: μi is magnetic core relative permeability, Ae is the same as in formula, being the effective sectional area (cm²) of the magnetic core, N is the number of turns of the coil, $l_e$ is the magnetic path length (cm), and the perimeter of the circumference dotted line 51 in FIG. 5 is magnetic path length $l_e$.

Figures 1, 2:
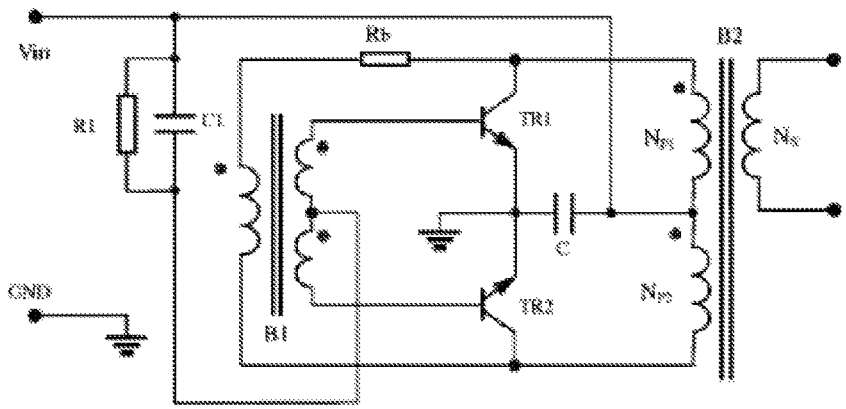
Figure 2:
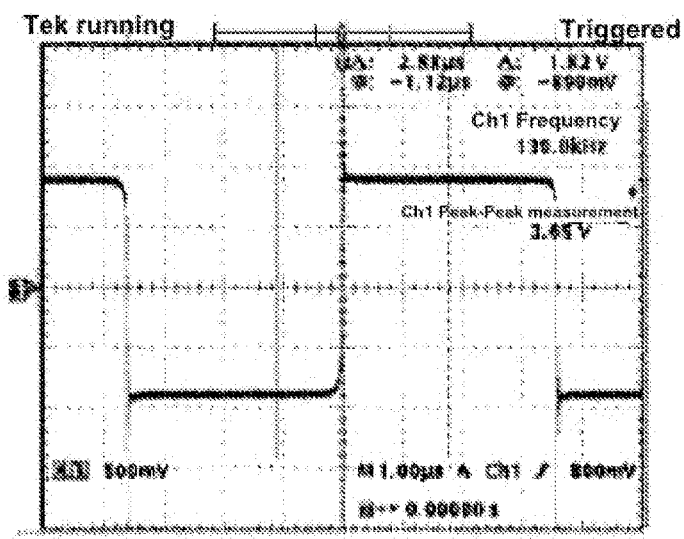
Figure 3:
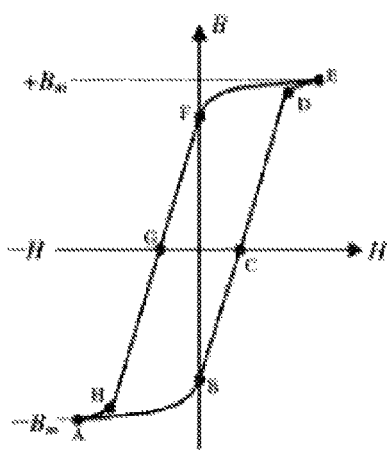
FIG. 3 is the square hysteresis loop of the magnetic core of transformer B1 in the Royer circuit of FIG. 1-1.
Figures 1, 10:
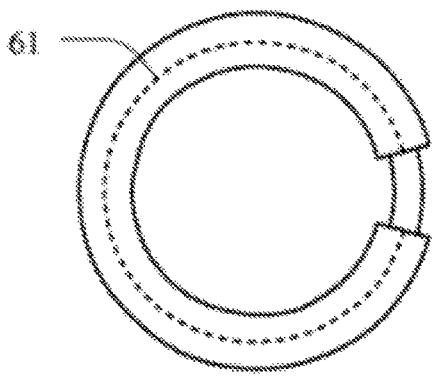
Figures 2, 10:
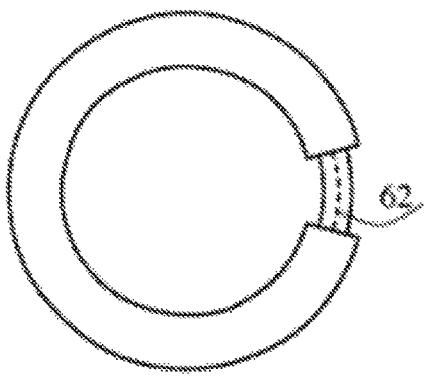

FIGS. 9-1 to 9-4 show the structural diagram of the magnetic core in embodiment 1, FIG. 9-1 is the front view of the magnetic core in embodiment 1 of this invention; FIG. 9-2 is the side view of the magnetic core in embodiment 1 of this invention; FIG. 9-3 is the top view of the magnetic core in embodiment 1 of this invention; and FIG. 9-4 is the 3D view of the magnetic core in embodiment 1 of this invention. In FIG. 9-1, the circumference dotted line 51 is the length of the geometric magnetic path, which is actually divided into two sections, one is in the thick part, its length is denoted as $l_w$, being the magnetic path inside the thick part 52 in FIG. 9-1, and the other section of the geometric magnetic path is within the thin part, its length is denoted as $l_t$, being the magnetic path inside the thin part 53 in FIG. 9-1. FIG. 10-1 and FIG. 10-2 are respectively the schematic diagrams of the magnetic path in this invention, in FIG. 10-1, the dotted line 61 shows the magnetic path length $l_w$ within the thick part, in FIG. 10-2, the dotted line 62 shows the magnetic path length $l_t$ within the thin part, then in embodiment 1 of this invention, the inductance of the coil wound on the thick part can be calculated using the Faraday's law, suppose the effective sectional area of the thin part is $S_1$, then the effective sectional area of the thick part is $kS_1$, substitute them into formula (3), the inductance $L_1$ of the N-turn coil on the thick part is:

$$L_1 = \frac{4\pi \times \mu i \times kS_1 \times N^2}{l_w + kl_t} \quad \text{Formula (4)}$$

where: $\mu i$ is the relative permeability of the magnetic core; $S_1$ is the effective sectional area (cm²) of the thin part of the magnetic core, i.e. $kS_1$ is effective sectional area of the thick part, the same as S in formula (1); N is the number of turns of coil; the denominator is the total equivalent length of the magnetic path (cm), being the sum of the equivalent length of the magnetic path $l_w$ in the thick part and magnetic path $l_e$ in the thin part, the effective sectional area of the thin part is 1/k that of the thick part, to make equivalent the magnetic path $l_t$ within the thin part to the effective sectional area of the thick part, according to the generally known theory, it should be multiplied with k, so the length is equivalent to $kl_t$, i.e.:

$$l_{equivalent\ length} = kl_t \quad \text{Formula (5)}$$

Figures 1, 11:
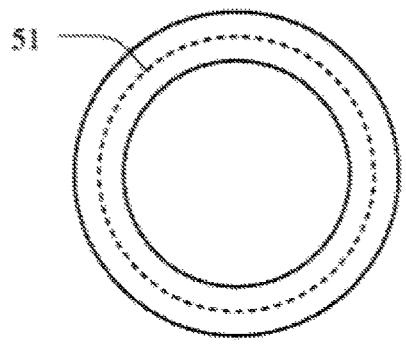
Figures 2, 11:
Figures 3, 11:
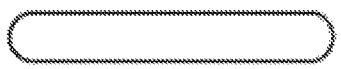

The equivalent length of magnetic path lt is $l_t$ times its inherit length. FIGS. 11-1, 11-2 and 11-3 are respectively the front view, side view and top view of the magnetic core for comparison with the existing technology, to facilitate the description of the principle of this invention, the length of the geometric magnetic path 51 of the magnetic core for comparison with the existing technology in FIG. 11-1 is equal to the length of the geometric magnetic path of the circumference dotted line 51 of the magnetic core of this invention in FIG. 9-1, as the effective sectional area magnetic core for comparison with the existing technology in FIG. 11-1 is equal everywhere, the length of its geometric magnetic path 51 is equal to the actual magnetic path length, and the effective sectional area of the magnetic core in FIG. 11-1 is equal to the effective sectional area of the thick part of the magnetic core of this invention in FIG. 9-1, i.e. $kS_1$, then the magnetic cores in FIGS. 11-1 to 11-3 have:

$$l_e = l_w + l_t \quad \text{Formula (6)}$$

$$Ae = k_1 \quad \text{Formula (7)}$$

When we substitute the above into formula (3), the inductance $L_2$ of the coil with the same N turns as the magnetic core for comparison with the existing technology in FIG. 11-1 is:

$$L_2 = \frac{4\pi \times \mu i \times kS_1 \times N^2}{l_w + l_t} \quad \text{Formula (8)}$$

Compare formula (4) with formula (8), we obtain:

$$\frac{L_1}{L_2} = \left(\frac{4\pi \times \mu i \times kS_1 \times N^2}{l_w + kl_t}\right) \div \left(\frac{4\pi \times \mu i \times kS_1 \times N^2}{l_w + l_t}\right) = \frac{l_w + l_t}{l_w + kl_t} \quad \text{Formula (9)}$$

That is, the inductance of the transformer realized with the magnetic core of this invention and the same number of turns is:

$$L_1 = \frac{l_w + l_t}{l_w + kl_t} L_2 \quad \text{Formula (10)}$$

According to formula (10), as the sectional area of the thick part is larger than that of the thin part, i.e. k is constantly greater than 1, the N-turn inductance $L_1$ of the magnetic core in embodiment 1 of this invention is less than the N-turn inductance $L_2$ of the magnetic core in the existing technology, as long as k is not taken too big, and the $l_t$ in the thin part is sufficiently short, the inductance $L_1$ of the N-turn coil of the magnetic core in embodiment 1 of this invention can be quite close to $L_2$, for example $L_1 = 0.99\ L_2$, with this, due to the existence of the thin part, when the magnetic core of this invention is used in a self-excitation push-pull converter, it can still trigger the push-pull oscillation in the circuit, because of the similar inductance, and the working frequency changes very little, as the magnetic saturation only occurs in the thin part, the energy loss is low, the no-load input current is small, therefore the conversion efficiency of the self-excitation push-pull converter can be substantially improved.

As the magnetic path lt of the thin part is the smaller the better, so that less part is required for the magnetic ring to reach magnetic saturation, and the loss can be reduced more apparently, the lower limit of the length of the thin part is taken as 0.05 mm because 0.05 mm is the limit of the current mould forming process or cutting process for magnetic cores, in fact, the purpose of this invention can be better realized with a size below 0.05 mm.

The following is the process to prove the dimensional limits in the claims, up to formula (10-10), the methods and processes in this proof are academically initials not published before:

With reference to formula (6), let x be the proportion of thin part length 53 in the total magnetic path length 51, we have:

$$l_t = xl_e \quad \text{Formula (10-1)}$$

$$l_e = (1-x)l_e \quad \text{Formula (10-2)}$$

According to formula (10), the N-turn inductance $L_1$ of the magnetic core in embodiment 1 of this invention is smaller than the N-turn inductance $L_2$ of the existing technology, a constant k is introduced, being a percentage, as it is convenient to express it in decimals, it is required that y be less than 0.1, and it can approach zero infinitely, suppose:

$$L_1 = (1-y)L_2 \quad \text{Formula (10-3)}$$

Substitute formula (6), formula (10-1), formula (10-2) and formula (10-3) into formula (10):

$$(1-y)L_2 = \frac{l_e}{(1-x)l_e + kxl_e} L_2 \quad \text{Formula (10-4)}$$

Simplify formula (10-4) by dividing out $L_2$ on both left and right, and dividing out $L_e$ from the numerator and denominator on the right of the equation, we obtain:

$$1 - y = \frac{1}{1 - x + kx} = \frac{1}{1 + x(k-1)} \quad \text{Formula (10-5)}$$

Formula (10-5) is simplified as:

$$x(k-1) = \frac{1}{1-y} - 1 \quad \text{Formula (10-6)}$$

Because y is smaller and equal to 0.1, we have the following equations in engineering calculation:

$$1-y^2 \approx 1 \qquad \text{Formula (10-7)}$$

When y=0.1, formula (10-7) obtains 0.99≈1, with an error of 1%, it has satisfied with the precision for engineering calculation, as y is smaller than and equal to 0.1, formula (10-7) can obtain:

$$(1-y)(1+y) \approx 1 \qquad \text{Formula (10-8)}$$

i.e.:

$$\frac{1}{1-y} \approx 1+y \qquad \text{Formula (10-9)}$$

In formula (10-9), y is taken as the maximum value 0.1, then we have:

$$1.1 \approx 1.1$$

That is, the circulating decimal 1.1 is approximately equal to 1.1, with an error of 1%, when y drops to 0.05, or by 5%, it is 1.05263≈1.05, with an error of 0.25%, which is already quite accurate. Substitute formula (10-9) into formula (10-6), we have:

$$x(k-1) = \frac{1}{1-y} - 1 \approx 1+y-1 = y \qquad \text{Formula (10-10)}$$

i.e.:

$$y \approx x(k-1)$$

It can be seen from formula (10-3) that, in this invention, a smaller y value is preferable, as this will have a magnetic core inductance closer to the desired value, in this way, it is not necessary to increase the number of turns of the coil in embodiment 1 of this invention, and it is found in the experimental test that only when the sectional area of the thin part is below 80% of that of the said thick part, can it be ensured that no magnetic saturation will occur in the thick part when magnetic saturation occurs in the thin part. As transistors have a storage time, that is, after the transistor base has received a cutting off signal, the collector current will drop with a time delay till cut-off, the storage time can occur in FIG. 3, the moving line of the magnetic core working point will be from point D to E, correspondingly, the moving line of the magnetic core working point will move from point H to A. When the moving line of the magnetic core working point moves from point D to E, it will increase the magnetic flux in the magnetic core, which will result in saturation within the thick part with an area not quite different, therefore, only when the sectional area of the thin part is below 80% of that of the said thick part, can it be ensured that no magnetic saturation will occur in the thick part when the moving line of the afore-said magnetic core working point moves from point D to E. k is the reciprocal of the afore-said 80%, being 1.25.

When k is taken as 1.25, if y in formula (10-10) is not greater than 3%, then:

$$x=y/(k-1)=0.03/(1.25-1)=0.12$$

x is the proportion of the thin part length 53 in the total magnetic path length 51, and 0.12 is approximately one eighth, i.e. the said thin part has a length of over 0.05 mm, less than one eighth of the total magnetic path length.

Of course, it is only an example with y as 3%, Table 2 below gives the tolerable deviation values commonly used in electronic engineering, all obtained using formula (10-10):

TABLE 2

| Expected value Y | X obtained from calculation | Percentage of thin part length in total magnetic path length |
|---|---|---|
| 1% | 0.04 | One 25th |
| 2% | 0.08 | One 12th |
| 3% | 0.12 | One 8th |
| 5% | 0.2 | One 5th |
| 10% | 0.4 | About one 3rd |

It is verified in experimental test that a fairly good implementation effect can be obtained only when y is taken below 3% in this invention.

In actual application, when the value exceeds 25, i.e. the sectional area of thick part is 25 times that of thin part, the thin part is likely to break as its strength cannot be guaranteed, and an air gap will form after break, making it impossible to use in a self-excitation push-pull converter, when the value exceeds 25, as the "window area" that can be wound with wire in the ring center is too small, it often requires extending the length of the geometric magnetic path 51 in FIG. 9-1 to implement it, it can be seen from formula (3) that, the extension of the length of the geometric magnetic path 51 can reduce the inductance, which in turn requires increasing the number of turns, therefore reducing the implementation effect.

Therefore, the value of k is required to be 1.25 to 25 times, and then the sectional area of the thin part is below 80% and above 4% of that of the thick part.

In the following, a set of measured data will demonstrate the actual effect of the magnetic core in embodiment 1. Take FIG. 1-1 as an example, the plans adopted in the existing technology and presented in background technology are identical.

A circuit as shown in FIG. 1-1 is used to make a converter with input DC at 5V, output DC at 5V and output current of 200 mA, i.e. with an output power of 1 W. The downstream output of the transformer is in the circuit structure as shown in FIG. 4, which is a generally known full-wave rectifying circuit. The main parameters of the circuit are: the capacitor C is 1 uF, resistor R1 is 1KΩ, capacitor C1 is 0.047 uF, and TR1 and TR2 are switching transistors with magnification factor of about 200, with its maximum collector working current being IA; the primary side coils $N_{P1}$ and $N_{P2}$ have respectively 20 turns, feedback coils $N_{B1}$ and $N_{B2}$ respectively 3 turns, secondary side coils $N_{S1}$ and $N_{S2}$ respectively 23 turns, and the magnetic core is a common ferrite loop magnetic core with an outer diameter of 5 mm and sectional area of 1.5 mm².

With the above parameters set, at an output of 10 mA as 5% of the full load of 200 mA of the output current, the measured parameters are as shown in Table 1 of background technology, with an efficiency of 38.03%.

In embodiment 1 of this invention, the magnetic core has an outer diameter of 5 mm, with the sectional area of thick part being 1.5 mm² and that of thin part being 1.2 mm², i.e. the k value is 1.25, and the thin part has a length of 1 mm.

No coil will be made on the thin part, a transformer as shown in FIG. 1-1 is made with the same number of turns, when the transformer made as per embodiment 1 of this invention is connected into the circuit, with the output current at 10 mA, or 5% of the full load 200 mA, the efficiency is tested also using the circuit in FIG. 6, and in conjunction with Table 1, the measured data are as shown in Table 3:

TABLE 3

|  | Input current Iin | Input voltage Vin | Output current Iout | Output voltage Vout | Efficiency (calculated value) |
| --- | --- | --- | --- | --- | --- |
| Actually measured with existing technology | 28.4 mA | 5.060 V | 9.96 mA | 5.487 V | 38.03% |
| Actually measured with the transformer made as per embodiment 1 of this invention in the circuit | 25.6 mA | 5.066 V | 9.95 mA | 5.482 V | 42.05% |

Obviously, after using this invention, the efficiency of the self-excitation push-pull converter when working with low load has been substantially increased, by (42.05%−38.03%)=4.02%.

Further, tests were made from low load to full load, and records were made in Table 4:

TABLE 4

| Load rate | Product | Iin (mA) | Vin (V) | Iout (mA) | Vout (V) | Efficiency | Efficiency increase |
| --- | --- | --- | --- | --- | --- | --- | --- |
| 5% | Existing technology | 28.4 | 5.060 | 9.96 | 5.487 | 38.03% | 4.02% |
|  | This invention | 25.6 | 5.066 | 9.95 | 5.482 | 42.05% |  |
| 100% | Existing technology | 242.0 | 5.024 | 198.00 | 5.094 | 82.96% | 1.54% |
|  | This invention | 239.1 | 5.025 | 199.00 | 5.102 | 84.50% |  |

Obviously, after using this invention, the efficiency of the self-excitation push-pull converter when working with both low load and full load has been increased, as the value k is small, ordinary effect is obtained.

The no-load current of the self-excitation push-pull converter has been reduced from 18.0 mA of the existing technology to 14.1 mA of this invention, i.e. the no-load loss has reduced from 90 mW of the existing technology to 70.5 mW of this invention.

Embodiment 2

FIGS. 9-1 to 9-4 show the structure of the magnetic core of embodiment 2 of this invention, the magnetic core is a magnetic ring of closed magnetic path without air gap, the ring is in cylindrical shape, consisting of a thick part and a thin part of the same material, the thin part has a length of over 0.05 mm, and less than one eighth of the total magnetic path length; and the sectional area of the thin part is below 80% and above 4% of the sectional area of the said thick part.

To clearly demonstrate the effect of this embodiment, in the magnetic core of embodiment 2 of this invention, the sectional area of the thin part is 4% that of the thick part, i.e. in embodiment 2 of this invention, the magnetic core has an outer diameter of 5 mm, with the sectional area of thick part being 1.5 mm$^2$ and that of thin part being 0.06 mm$^2$, actually, the thin part 53 in FIG. 9-1 is cut using cutting technique, the diameter of the thin part is 0.276±0.02 mm, i.e. the k value is 25, due to the restriction of the thickness of the ring cutter blade, the length of the thin part is 0.15 mm, and it cannot be further reduced. No coil will be made on the thin part, a transformer as shown in FIG. 1-1 is made with the same number of turns, when the transformer made as per embodiment 1 of this invention is connected into the circuit, with the output current at 10 mA, or 5% of the full load 200 mA, the efficiency is tested also using the circuit in FIG. 6, and in conjunction with Table 1, the measured data are as shown in Table 5:

TABLE 5

|  | Input current Iin | Input voltage Vin | Output current Iout | Output voltage Vout | Efficiency (calculated value) |
| --- | --- | --- | --- | --- | --- |
| Actually measured with existing technology | 28.4 mA | 5.060 V | 9.96 mA | 5.487 V | 38.03% |
| Actually measured with the transformer made as per embodiment 2 of this invention in the circuit | 15.5 mA | 5.066 V | 9.95 mA | 5.484 V | 69.49% |

Obviously, after using this invention, the efficiency of the self-excitation push-pull converter when working with low load has been substantially increased, by (69.49%−38.03%)=31.46%. This is the efficiency measured with an output current of 10 mA, or output power of 50 mW.

Further, test was performed with an output current of 20 mA, with the corresponding load rate being (20+200)× 100%, and the results are recorded in Table 6:

TABLE 6

| Load rate | Product | Iin (mA) | Vin (V) | Iout (mA) | Vout (V) | Efficiency | Efficiency increase |
|---|---|---|---|---|---|---|---|
| 5% | Existing technology | 28.4 | 5.060 | 9.96 | 5.487 | 38.03% | 31.46% |
|  | This invention | 15.5 | 5.066 | 9.95 | 5.484 | 69.49% |  |
| 10% | Existing technology | 40.0 | 5.045 | 20.00 | 5.424 | 53.76% | 27.97% |
|  | This invention | 26.3 | 5.052 | 20.00 | 5.430 | 81.73% |  |

Obviously, after using this invention, the conversion efficiency of the self-excitation push-pull converter when working with low load below 100 mW, or with an output current below 20 mA has been obviously increased, as a very high value k is taken, the effect is substantial. However, as the thin part diameter is 0.276±0.02 mm, it is quite difficult to make it, quite easy to break in experiment, and the finished product rate is extremely low.

The no-load current of the self-excitation push-pull converter has been reduced from 18.0 mA of the existing technology to 4.8 mA of this invention, i.e. the no-load loss has reduced from 90 mW of the existing technology to 24 mW of this invention.

Embodiment 3

The magnetic core shown in structural drawings FIGS. 9-1 to 9-4 are still used in embodiment 3, the magnetic core is a magnetic ring of closed magnetic path without air gap, the ring is in cylindrical shape, consisting of a thick part and a thin part of the same material, the thin part has a length of over 0.05 mm, and less than one eighth of the total magnetic path length; and the sectional area of the thin part is below 80% and above 4% of the sectional area of the said thick part.

In the two embodiments above, the implementation effect is demonstrated with two extreme values of k, to clearly present the effect of this embodiment, in embodiment 3, the median value 2 is taken for constant k. In the application of embodiment 1 of this invention, the magnetic core has an outer diameter of 5 mm, with the sectional area of thick part being 1.5 mm$^2$ and that of thin part being 0.75 mm$^2$, i.e. the k value is 2, and the thin part has a length of 1 mm. No coil will be made on the thin part, a transformer as shown in FIG. 1-1 is made with the same number of turns, when the transformer made as per embodiment 1 of this invention is connected into the circuit, with the output current at 10 mA, or 5% of the full load 200 mA, the efficiency is tested also using the circuit in FIG. 6, and in conjunction with Table 1, the measured data are as shown in Table 7:

TABLE 7

|  | Input current Iin | Input voltage Vin | Output current Iout | Output voltage Vout | Efficiency (calculated value) |
|---|---|---|---|---|---|
| Actually measured with existing technology | 28.4 mA | 5.060 V | 9.96 mA | 5.487 V | 38.03% |
| Actually measured with the transformer made as per embodiment 3 of this invention in the circuit | 23.5 mA | 5.066 V | 9.95 mA | 5.480 V | 45.80% |

Obviously, after using this invention, the efficiency of the self-excitation push-pull converter when working with low load has been substantially increased, by (45.80%−38.03%)=7.77%.

Further, tests were made over the full range from low load to full load at steps of 5%, and at steps of 10% when the load rate is over 40%, records were made in Table 8:

TABLE 8

| Load rate | Product | Iin (mA) | Vin (V) | Iout (mA) | Vout (V) | Efficiency | Efficiency increase |
|---|---|---|---|---|---|---|---|
| 5% | Existing technology | 28.4 | 5.060 | 9.96 | 5.487 | 38.03% | 7.77% |
|  | This invention | 23.5 | 5.066 | 9.95 | 5.480 | 45.80% |  |
| 10% | Existing technology | 40.0 | 5.045 | 20.00 | 5.424 | 53.76% | 7.65% |
|  | This invention | 35.0 | 5.052 | 20.00 | 5.429 | 61.41% |  |
| 15% | Existing technology | 51.1 | 5.031 | 30.10 | 5.381 | 63.00% | 6.21% |
|  | This invention | 46.5 | 5.037 | 30.10 | 5.386 | 69.22% |  |
| 20% | Existing technology | 62.7 | 5.016 | 40.00 | 5.341 | 67.93% | 6.09% |
|  | This invention | 57.7 | 5.022 | 40.10 | 5.349 | 74.02% |  |
| 25% | Existing technology | 73.7 | 5.002 | 50.00 | 5.305 | 71.95% | 4.86% |
|  | This invention | 69.2 | 5.008 | 50.10 | 5.313 | 76.81% |  |
| 30% | Existing technology | 85.1 | 4.987 | 59.90 | 5.269 | 74.37% | 4.73% |
|  | This invention | 80.2 | 4.994 | 60.00 | 5.280 | 79.10% |  |
| 35% | Existing technology | 96.3 | 4.973 | 69.90 | 5.236 | 76.42% | 4.09% |
|  | This invention | 91.6 | 4.978 | 70.00 | 5.245 | 80.52% |  |
| 40% | Existing technology | 107.6 | 4.960 | 79.70 | 5.202 | 77.68% | 4.02% |
|  | This invention | 102.7 | 4.965 | 79.90 | 5.214 | 81.70% |  |
| 50% | Existing technology | 130.1 | 4.931 | 99.70 | 5.138 | 79.85% | 3.24% |
|  | This invention | 125.4 | 4.936 | 99.90 | 5.148 | 83.09% |  |
| 60% | Existing technology | 153.8 | 4.900 | 120.50 | 5.073 | 81.11% | 2.98% |
|  | This invention | 148.7 | 4.907 | 120.70 | 5.084 | 84.10% |  |
| 70% | Existing technology | 174.9 | 4.873 | 139.40 | 5.013 | 81.99% | 2.48% |
|  | This invention | 170.1 | 4.879 | 139.60 | 5.022 | 84.47% |  |
| 80% | Existing technology | 199.8 | 4.847 | 161.80 | 4.950 | 82.70% | 2.16% |
|  | This invention | 195.0 | 4.845 | 161.90 | 4.952 | 84.86% |  |
| 90% | Existing technology | 220.0 | 5.030 | 180.00 | 5.131 | 83.46% | 2.10% |
|  | This invention | 215.0 | 5.032 | 180.20 | 5.137 | 85.56% |  |
| 100% | Existing technology | 242.0 | 5.024 | 198.00 | 5.094 | 82.96% | 2.28% |
|  | This invention | 237.0 | 5.025 | 199.00 | 5.101 | 85.24% |  |

Figure 12:
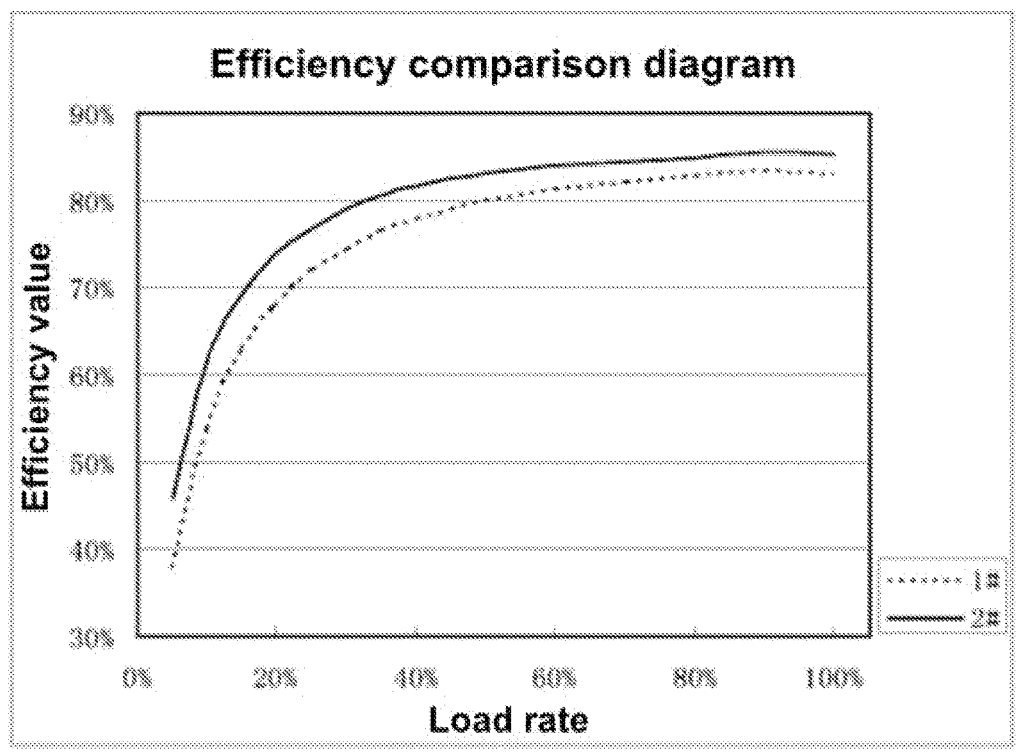
FIG. 12 is the efficiency comparison diagram of embodiment 4 of this invention with the magnetic core of existing technology fitted into circuit.

Obviously, after using this invention, the conversion efficiency of the self-excitation push-pull converter in the whole range from low load and full load has been significantly increased, a comparison chart is made using software, refer to FIG. 12, in which curve 2# is the conversion efficiency curve of the self-excitation push-pull converter after using this invention, and curve 1# is the conversion efficiency curve of the self-excitation push-pull converter with the existing technology.

The no-load current of the self-excitation push-pull converter has also been reduced from 18.0 mA of the existing technology to 12.0 mA of this invention, i.e. the no-load loss has reduced from 90 mW of the existing technology to 60 mW of this invention, or by 30 mW with each product.

According to incomplete statistics, there are at least 1 billion micro power modules with self-excitation push-pull converter currently in use, if they all use the technical plan of this invention, they can save power of over 30 million kWh per hour.

This invention has not only solved the technical issue to be solved in working principle, the above-mentioned many formula derivatives published for the first time also give powerful theoretical support to this invention, meanwhile, the experimental justification has proved that this invention can be fully used in industrial applications to produce the expected effect. Since the self-excitation push-pull converter was made public in 1955, after development and innovation over half a century and more, no one has been able to use the technical means of this invention to solve the technical issue to be solved with this invention, it is because of the insufficient understanding of the theoretical aspect of this circuit that no one has realized that a simple improvement as this invention can be made to produce substantial effects.

Embodiment 4

The transformer used in the self-excitation push-pull converter in embodiment 4 of this invention is slightly different from that in embodiments 1, 2 and 3, but they are identical in essence, the magnetic core is a magnetic ring of closed magnetic path without air gap, the ring is in cylindrical shape, consisting of a thick part and a thin part of the same material, the thin part has a length of over 0.05 mm, and less than one eighth of the total magnetic path length; and the sectional area of the thin part is below 50% and above 6.25% of the sectional area of the said thick part.

In embodiment 1, the thick part of the magnetic core has the same sectional area of magnetic core of the existing technology, but the sectional area of the thin part is smaller than that of the existing technology, at a ratio of 1/k. To fully demonstrate the effect of this embodiment, in the transformer magnetic core used in embodiment 4 of this invention, the sectional area of the thin part is equal to that of the existing technology, that is, the sectional area of the thick part is k times that of the existing technology.

FIGS. 11-1, 11-2 and 11-3 are respectively the front view, side view and top view of the magnetic core for comparison of the existing technology with that in embodiment 4 of this invention, suppose the sectional area of the magnetic core of the existing technology is $S_2$, when we substitute it into formula (3), the inductance $L_3$ of the coil with the same N turns as the magnetic core for comparison with the existing technology in FIG. 11-1 is:

$$L_3 = \frac{4\pi \times \mu i \times S_2 \times N^2}{l_e} \quad \text{Formula (11)}$$

The magnetic core of embodiment 4 of this invention is as shown in FIGS. 13-1 to 13-3, FIG. 13-1 is the front view of the magnetic core in embodiment 4 of this invention; FIG. 13-2 is the side view of the magnetic core in embodiment 4 of this invention; FIG. 13-3 is the top view of the magnetic core in embodiment 4 of this invention; in the magnetic core of embodiment 4, there is a small thin part 53 with the same sectional area as the magnetic core for comparison with the existing technology, i.e. the sectional area of the thin part 53 of the magnetic core in FIG. 13-1 is equal to the above-mentioned $S_2$, but its length is very short; correspondingly, the sectional area of the thick part 52 in FIG. 13-1 is larger than the sectional area of the magnetic core of the existing technology, equal to $kS_2$, the ratio is the reciprocal of the percentage in the technical plan, denoted as constant k, for which reciprocal is taken as for the technical plan above, being 1.25 to 25 times, accordingly, the inductance per turn of the coil on the thick part increases, and the inductance $L_4$ with the same number of turns of coil on the magnetic core of embodiment 4 of this invention is:

$$L_4 = \frac{4\pi \times \mu i \times kS_2 \times N^2}{l_w + kl_t} \quad \text{Formula (12)}$$

where: $\mu i$ is the relative permeability of the magnetic core; $S_2$ the effective sectional area (cm) of the thin part of the magnetic core, i.e. $kS_2$ is effective sectional area of the thick part, the same as S in formula (1); N is the number of turns of coil; the denominator is the total equivalent length of the magnetic path (cm), being the sum of the equivalent length of the magnetic path $l_w$ in the thick part and magnetic path $l_t$ in the thin part, as the effective sectional area of the thin part is 1/k that of the thick part, to make equivalent the magnetic path $l_t$ within the thin part to the effective sectional area of the thick part, it should be multiplied by k, so the length is equivalent to $kl_t$;

Compare formula (12) with formula (11), we obtain:

$$\frac{L_4}{L_3} = \left(\frac{4\pi \times \mu i \times kS_2 \times N^2}{l_w + kl_t}\right) \div \left(\frac{4\pi \times \mu i \times S_2 \times N^2}{l_e}\right) = \frac{kl_e}{l_w + kl_t} \quad \text{Formula (13)}$$

That is, the inductance of the transformer realized with the magnetic core of embodiment 4 of this invention and the same number of turns is:

$$L_4 = k\left(\frac{l_e}{l_w + kl_t} L_3\right) \quad \text{Formula (14)}$$

According to formula (14), if the magnetic path length in the thin part is sufficiently short, for instance close to 0.05 mm, the sum of the product $kl_t$ and magnetic path $l_w$ in the thick part will approach the magnetic path length $l_e$ of the magnetic core for comparison with the existing technology in FIG. 11-1, i.e. the inductance of the N-turn coil of the magnetic core of this invention $L_4 \approx kL_3$.

With the same number of turns, the inductance can be increased by about k times, that means the number of turns can be reduced as appropriate to realize the same inductance as that with the background technology; in other words, the number of turns in this invention can be reduced as appropriate, and the ratio n of the number of turns with the existing technology to that of this invention is:

$$n = \sqrt{\frac{1}{k}} \quad \text{Formula (15)}$$

i.e., when K is taken as 25, n=1/5=0.2, for the product with input voltage of 24V as mentioned in the background technology, a good working efficiency can be obtained with 96 turns, but with this invention, it only requires 96×0.2=19.2 turns, or rounded as 20 turns, to realize the same effect. That is why in the technical requirement, the sectional area of the said thin part length is below 80% and above 4% of the sectional area of the said thick part. In the above corresponding to embodiment 1, it is mentioned that: when the value exceeds 25, as the "window area" in the ring center is too small, it often requires extending the length of the geometric magnetic path 51 in FIG. 9-1 to implement it, it can be seen from formula (3) that, the extension of the length of the geometric magnetic path 51 can reduce the inductance, which in turn requires increasing the number of turns, therefore reducing the implementation effect.

Similarly, when k is taken as 16, n=1/4=0.25, so the number of turns can be reduced to ¼ of the original, making it easy to wind it.

In FIG. 13-1, due to the existence of the thin part 53, when the magnetic core of this invention is used in a self-excitation push-pull converter, it can still trigger the push-pull oscillation in the circuit, as the magnetic saturation only occurs in the thin part 53, which is fairly short, the energy loss is low, i.e. the no-load input current of the circuit of self-excitation push-pull converter is small, therefore the conversion efficiency of the self-excitation push-pull converter can be substantially improved; as the energy loss is low, the working frequency of the self-excitation push-pull converter can be further increased, and the resulted benefit is: the number of turns wound on the magnetic core of embodiment of this invention can be further reduced. In the following, a set of measured data will demonstrate the actual effect of the magnetic core in embodiment 4.

In the plan for comparison with existing technology, the plan adopted is the same as that in the background technology and presented in embodiment 1, and it is quoted below for convenience in comparison:

A circuit as shown in FIG. 1-1 is used to make a converter with input DC at 5V, output DC at 5V and output current of 200 mA, i.e. with an output power of 1 W. The downstream output of the transformer is in the circuit structure as shown in FIG. 4, which is a generally known full-wave rectifying circuit. The main parameters of the circuit are: the capacitor C is 1 uF, resistor R1 is 1KΩ, capacitor C1 is 0.047 uF, and TR1 and TR2 are switching transistors with magnification factor of about 200, with its maximum collector working current being 1 A; the primary side coils $N_{P1}$ and $N_{P2}$ have respectively 20 turns, feedback coils $N_{B1}$ and $N_{B2}$ respectively 3 turns, secondary side coils $N_{S1}$ and $N_{S2}$ respectively 23 turns, and the magnetic core is a common ferrite loop magnetic core with an outer diameter of 5 mm and sectional area of 1.5 mm².

With the above parameters set, at an output of 10 mA as 5% of the full load of 200 mA of the output current, the measured parameters are as shown in Table 1 of background technology, with an efficiency of 38.03%. For other parameters, refer to the part of corresponding existing technology in Tables 7 and 8.

In embodiment 4 of this invention, the magnetic core has an outer diameter of 5 mm, with the sectional area of thick part being 3 mm$^2$ and that of thin part being 1.5 mm$^2$, i.e. the k value is 2, and the thin part has a length of 0.5 mm. No coil will be made on the thin part, the primary side coils $N_{P1}$ and $N_{P2}$ have respectively 7 turns, the feedback coils $N_{B1}$ and $N_{B2}$ respectively 2 turns, and the secondary side coils $N_{S1}$ and $N_{S2}$ respectively 8 turns, when the transformer made as per embodiment 1 of this invention is connected into the circuit, the measured working frequency of the circuit is 139 kHz, with a no-load input current of 6.9 mA.

Figure 6:
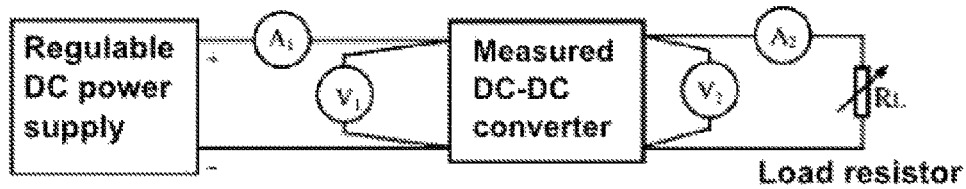
FIG. 6 is the principle diagram for conversion efficiency testing in general use in this article.
Figure 7:
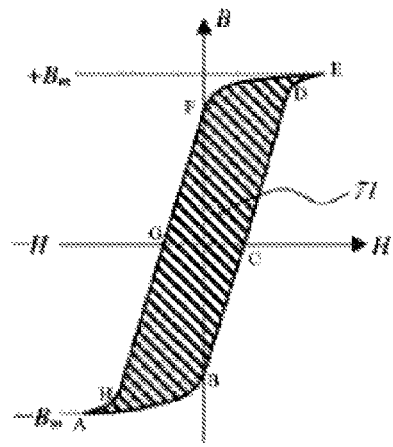
FIG. 7 is the working area diagram of the magnetic core in a self-excitation push-pull converter.
Figure 8:
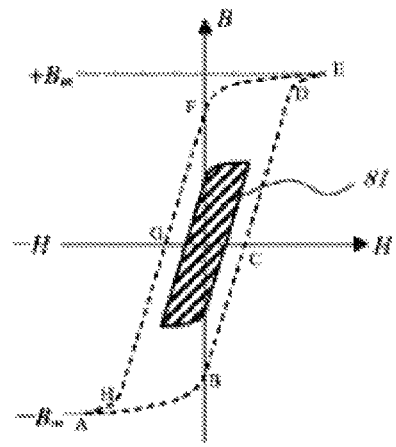
FIG. 8 is the working area diagram of the magnetic core corresponding to the thick part in this invention in a self-excitation push-pull converter.

When the output current is 5% of the full load 200 mA, or 10 mA, the efficiency is tested also using the circuit in FIG. 6, and in conjunction with Table 1, the measured data are as shown in Table 9:

TABLE 9

|  | Input current Iin | Input voltage Vin | Output current Iout | Output voltage Vout | Efficiency (calculated value) |
|---|---|---|---|---|---|
| Actually measured with existing technology | 28.4 mA | 5.060 V | 9.96 mA | 5.487 V | 38.03% |
| Actually measured with the transformer made as per embodiment 4 of this invention in the circuit | 17.5 mA | 5.066 V | 9.95 mA | 5.478 V | 61.48% |

Obviously, after using this invention, the efficiency of the self-excitation push-pull converter when working with low load has been substantially increased, by (61.48%–38.03%)=23.45%.

Further, tests were made over the full range from low load to full load at steps of 5%, and at steps of 10% when the load rate is over 40%, records were made in Table 10:

Apparently, after using this invention, the conversion efficiency of the self-excitation push-pull converter in the whole range from low load and full load has been obviously increased, a comparison chart is made using software, refer to FIG. 14, in which curve 2# is the conversion efficiency curve of the self-excitation push-pull converter after using this invention, and curve 1# is the conversion efficiency curve of the self-excitation push-pull converter with the existing technology.

The no-load current of the self-excitation push-pull converter has been reduced from 18.0 mA of the existing technology to 6.9 mA of this invention, i.e. the no-load loss has reduced from 90 mW of the existing technology to 34.5 mW of this invention. At the same time, the working frequency has increased from 97.3 kHz with the existing technology to 139 kHz in embodiment 2 of this invention.

The resulted benefit is to reducing the number of turns of the primary side coils $N_{P1}$ and $N_{P2}$ respectively from 20 to 7, reducing the work time in winding, and also avoiding mistakes.

It can be seen from Table 6 that, at a load of 10%, i.e. an output current of 20 mA, this invention still has an efficiency of 74%, if the magnetic core size is reduced to design a specific micro power DC/DC converter, the efficiency can be

TABLE 10

| Load rate | Product | Iin (mA) | Vin (V) | Iout (mA) | Vout (V) | Efficiency | Efficiency increase |
|---|---|---|---|---|---|---|---|
| 5% | Existing technology | 28.4 | 5.060 | 9.96 | 5.487 | 38.03% | 23.45% |
|  | This invention | 17.5 | 5.066 | 9.95 | 5.478 | 61.48% |  |
| 10% | Existing technology | 40.0 | 5.045 | 20.00 | 5.424 | 53.76% | 20.58% |
|  | This invention | 28.9 | 5.052 | 20.00 | 5.427 | 74.34% |  |
| 15% | Existing technology | 51.1 | 5.031 | 30.10 | 5.381 | 63.00% | 16.83% |
|  | This invention | 40.3 | 5.037 | 30.10 | 5.384 | 79.84% |  |
| 20% | Existing technology | 62.7 | 5.016 | 40.00 | 5.341 | 67.93% | 15.12% |
|  | This invention | 51.4 | 5.022 | 40.10 | 5.346 | 83.05% |  |
| 25% | Existing technology | 73.7 | 5.002 | 50.00 | 5.305 | 71.95% | 12.70% |
|  | This invention | 62.8 | 5.008 | 50.10 | 5.314 | 84.65% |  |
| 30% | Existing technology | 85.1 | 4.987 | 59.90 | 5.269 | 74.37% | 11.67% |
|  | This invention | 73.7 | 4.994 | 60.00 | 5.278 | 86.04% |  |
| 35% | Existing technology | 96.3 | 4.973 | 69.90 | 5.236 | 76.42% | 10.31% |
|  | This invention | 85.0 | 4.978 | 70.00 | 5.243 | 86.74% |  |
| 40% | Existing technology | 107.6 | 4.960 | 79.70 | 5.202 | 77.68% | 9.58% |
|  | This invention | 96.1 | 4.965 | 79.90 | 5.211 | 87.26% |  |
| 50% | Existing technology | 130.1 | 4.931 | 99.70 | 5.138 | 79.85% | 8.02% |
|  | This invention | 118.5 | 4.936 | 99.90 | 5.145 | 87.87% |  |
| 60% | Existing technology | 153.8 | 4.900 | 120.50 | 5.073 | 81.11% | 7.21% |
|  | This invention | 141.5 | 4.907 | 120.70 | 5.081 | 88.33% |  |
| 70% | Existing technology | 174.9 | 4.873 | 139.40 | 5.013 | 81.99% | 6.31% |
|  | This invention | 162.7 | 4.879 | 139.60 | 5.021 | 88.30% |  |
| 80% | Existing technology | 199.8 | 4.847 | 161.80 | 4.950 | 82.70% | 5.60% |
|  | This invention | 187.4 | 4.845 | 161.90 | 4.952 | 88.30% |  |
| 90% | Existing technology | 220.0 | 5.030 | 180.00 | 5.131 | 83.46% | 4.84% |
|  | This invention | 208.2 | 5.032 | 180.20 | 5.134 | 88.31% |  |
| 100% | Existing technology | 242.0 | 5.024 | 198.00 | 5.094 | 82.96% | 5.04% |
|  | This invention | 229.1 | 5.025 | 199.00 | 5.091 | 88.00% |  | further improved. In summary of the above, the overall implementation effect of embodiment 4 is good.

Embodiment 5

Figures 1, 15:
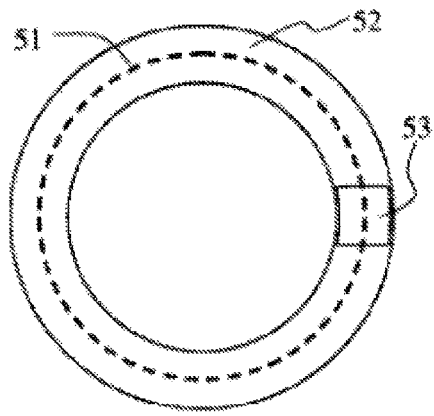
Figures 2, 15:
Figures 3, 15:
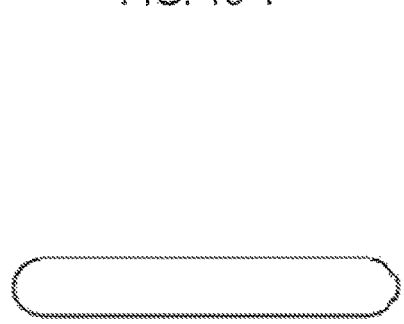
Figures 4, 15:
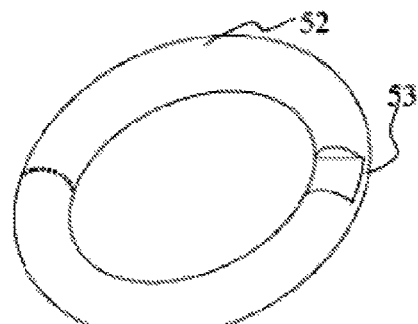

FIGS. 15-1 to 15-4 present embodiment 5 of this invention, FIG. 15-1 is the front view of the magnetic core in embodiment 5 of this invention; FIG. 15-2 is the side view of the magnetic core in embodiment 5 of this invention; FIG. 15-3 is the top view of the magnetic core in embodiment 5 of this invention; and FIG. 15-4 is the 3D view of embodiment 5 of this invention; there is also a small thin part 53 with smaller sectional area of magnetic core, on the cylindrical magnetic ring, a cut is made symmetrically to form a flake thin part 53, with a length of over 0.05 mm, and less than one eighth of the total magnetic path length; the sectional area of the thin part is below 80% and above 4% of the sectional area of the thick part. The working principle is identical to that in the above description of the invention and in embodiments 1 to 4, so it will not be repeated here.

Embodiment 6

Figures 1, 16:
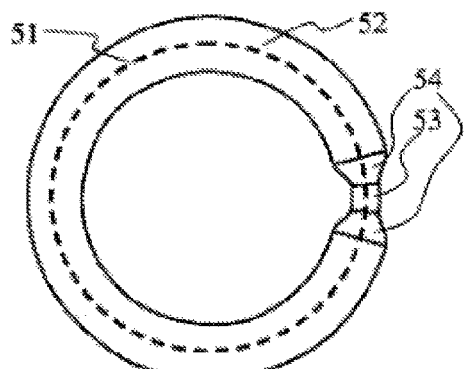
Figures 2, 16:
Figures 3, 16:
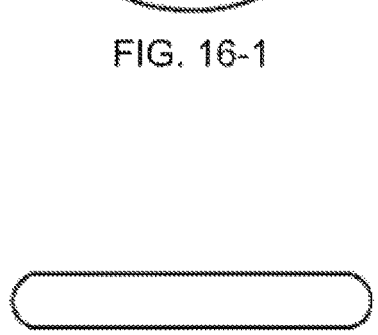
Figures 4, 16:
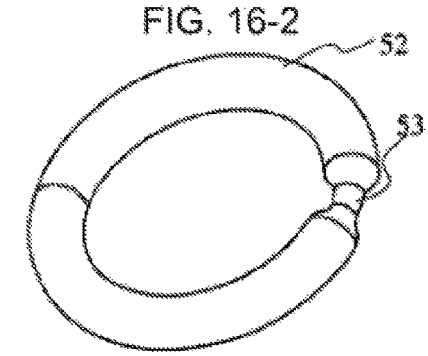

FIGS. 16-1 to 16-4 present embodiment 6 of this invention, FIG. 16-1 is the front view of the magnetic core in embodiment 6 of this invention; FIG. 16-2 is the side view of the magnetic core in embodiment 6 of this invention; FIG. 16-3 is the top view of the magnetic core in embodiment 6 of this invention; and FIG. 16-4 is the 3D view of embodiment 6 of this invention; there is also a small thin part 53 with smaller sectional area of magnetic core, the thick part 52, and the further improved features of embodiment 6: between the thick part and thin part there is a transition section 54, which can be equivalent as part of the thin part, or be regarded as there are three thin parts in this embodiment, the sectional area of the transition section is changing from big to small, in a differential point of view, actually there are countless number of thin parts, the transition section 54 is provided to facilitate demoulding of the magnetic core after magnetic powder moulding, and actually it is a further improvement to embodiment 1 in FIGS. 9-1 to 9-4. When there is one thin part 53 and two symmetrical thin parts 54 in this embodiment, the sectional area of the thin part 53 and two symmetrical thin parts 54 is not equal, then the thin part 53 with the smallest sectional area functions, and the sectional area of the thin part 53 with the smallest sectional area is below 80% and above 4% of the sectional area of the thick part. The inside of the magnetic core corresponding to thin part 54 will not become magnetic saturated, therefore it will not participate in the magnetic saturation.

Similarly, it is required that the length of the thin part and transition section 54 be short, and the sum of the transition section and the said thin part length be over 0.05 mm and less than one eighth of the total magnetic path length. The working principle is identical to that in the above description of the invention and in embodiments 1 to 4, so it will not be repeated here. Due to the presence of transition section 54, the length of thin part 53 can be zero, and in this case, there is still a part with the minimum sectional area, and this part can reach magnetic saturation first, so the purpose of the invention can still be realized.

Embodiment 7

Figures 1, 17:
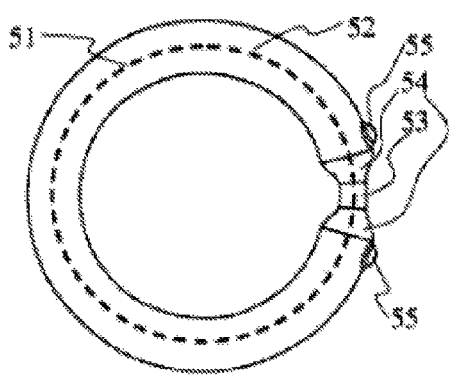
Figures 2, 17:
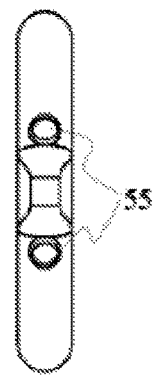
Figures 3, 17:
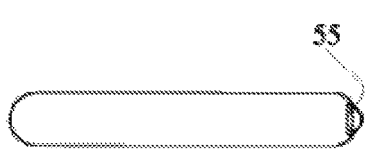
Figures 4, 17:
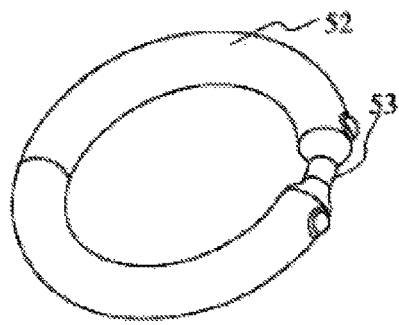

FIGS. 17-1 to 17-4 present embodiment 7 of this invention, FIG. 17-1 is the front view of the magnetic core in embodiment 7 of this invention; FIG. 17-2 is the side view of the magnetic core in embodiment 7 of this invention; FIG. 17-3 is the top view of the magnetic core in embodiment 7 of this invention; and FIG. 17-4 is the 3D view of embodiment 7 of this invention.

The improvement feature of embodiment 7 of this invention is: on the basis of embodiment 6, two or more salient points 55 are added on the thick part, to prevent the wire on the thick part from sliding to the thin part, and salient points 55 can be at any position on the thick part. Another function of salient points 55 is to determine the zone of different windings, to prevent their mutual intersection.

As there is also a small thin part 53 with smaller sectional area of magnetic core, the thick part 52, and the transition section 54 between the thick part and thin part, the transition section 54 can be equivalent as part of the thin part, the transition section 54 is provided to facilitate demoulding of the magnetic core after magnetic powder moulding, and actually it is a further improvement to embodiment 6 in FIGS. 16-1 to 16-4.

Similarly, it is required that the length of the thin part and the transition section 54 be short. The working principle is identical to that in the above description of the invention and in embodiments 1 to 4, so it will not be repeated here. Due to the presence of transition section 54, the length of thin part 53 can be zero, and the purpose of the invention can still be realized.

Embodiment 8

Figures 1, 18:
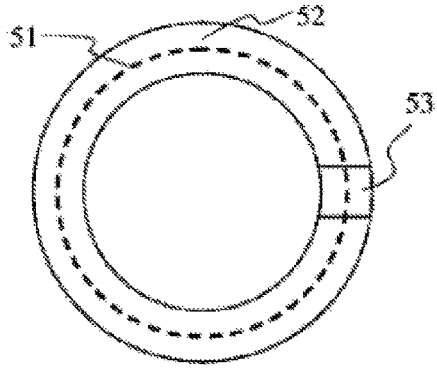
Figures 2, 18:
Figures 3, 18:
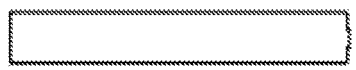
Figures 4, 18:
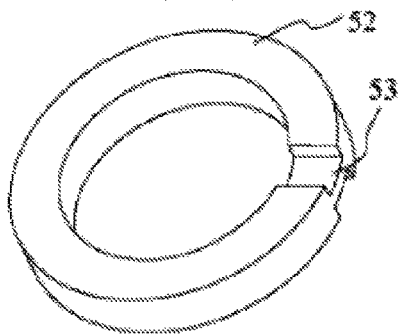

FIGS. 18-1 to 18-4 present embodiment 8 of this invention, FIG. 18-1 is the front view of the magnetic core in embodiment 8 of this invention; FIG. 18-2 is the side view of the magnetic core in embodiment 8 of this invention; FIG. 18-3 is the top view of the magnetic core in embodiment 8 of this invention; and FIG. 18-4 is the 3D view of embodiment 8 of this invention; the air gap free magnetic path closed magnetic ring consists of the flat thick part 52 and thin part 53 of the same material, the thin part 53 has a length of over 0.05 mm, and less than one eighth of the total magnetic path length; the sectional area of the thin part 53 is below 80% and above 4% of the sectional area of the thick part 52.

The working principle is identical to that in the above description of the invention and in embodiments 1 to 4, so it will not be repeated here.

Embodiment 9

Figures 1, 19:
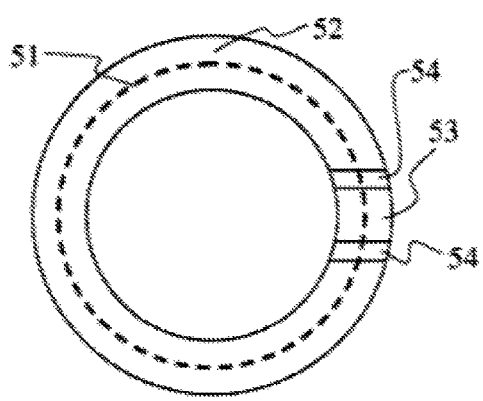
Figures 2, 19:
Figures 3, 19:
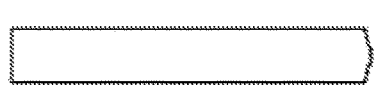
Figures 4, 19:
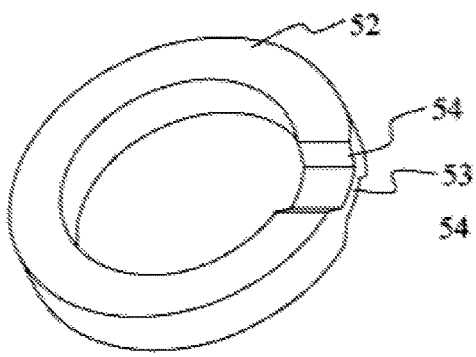

FIGS. 19-1 to 19-4 present embodiment 9 of this invention, FIG. 19-1 is the front view of the magnetic core in embodiment 9 of this invention; FIG. 19-2 is the side view of the magnetic core in embodiment 9 of this invention; FIG. 19-3 is the top view of the magnetic core in embodiment 9 of this invention; and FIG. 19-4 is the 3D view of embodiment 9 of this invention; there is also a small thin part 53 of the magnetic core with smaller sectional area, and a thick part 52.

In embodiment 9, a transition section 54 exists between the thick part and thin part, the transition section 54 can be equivalent as part of the thin part, the transition section 54 is provided to facilitate demoulding of the magnetic core after magnetic powder moulding, and actually it is a further improvement to embodiment 8 in FIGS. 18-1 to 18-4. Due to the presence of transition section 54, the length of thin part 53 can be zero, and the purpose of the invention can still be realized.

The working principle of embodiment 9 is identical to that in the above description of the invention and in embodiments 1 to 4, so it will not be repeated here.

The above are only preferable embodiments of this invention, and it should be pointed out that, the preferable embodiments above should not be regarded as restrictions to this invention, and the scope of protection for this invention shall be that defined by the claims. For ordinary technical personnel in this technological field, within the essence and scope of this invention, some improvements and decorations can be made, and such improvements and decorations shall also be covered in the scope of protection of this invention. For example, the said thin part and thick part can be embodied by using magnetic rings of sectional area in different geometric shapes, or the profile of the whole magnetic core as aforesaid can be embodied with a square or elliptic magnetic ring.

What is claimed is:

1. A magnetic core for a transformer, being of a closed ring shape and comprising a thick part and at least one thin part, said thin part has a sectional area less than 80% and greater than 4% of the sectional area of said thick part, said thin part reaches magnetic saturation before said thick part when excited under an increasing magnetic field, and the thin part only operates briefly at or near a first quadrant saturation point or a third quadrant saturation point and, for all other times, the thin part operates in a state between the first quadrant saturation point and the third quadrant saturation point, wherein a length of the thin part is negatively correlated to a ratio of the sectional area of the thick part to the sectional area of the thin part.

2. The magnetic core of claim 1, which comprises a plurality of thin parts connected in serial.

3. The magnetic core of claim 1, wherein said thin part has the length greater than 0.05 mm and less than one eighth of a length of the total magnetic path of the magnetic core.

4. The magnetic core of claim 1, where said thin part has the sectional area of a size less than 50% and greater than 6.25% of the sectional area of the said thick part.

5. The magnetic core of claim 1, wherein said thick part and said thin part are made of a same material.

6. The magnetic core of claim 1, further comprising a transition section between said thick part and said thin part to facilitate demoulding.

7. The magnetic core of claim 1, wherein said thick part has two or more salient points to prevent winding wires from sliding onto said thin part, or to ensure different windings in given areas.

8. The magnetic core of claim 1, wherein said thick part is wound with a coil, and said thin part is not wound with a coil.

9. The magnetic core of claim 1, wherein a proportion of the length of the thin part in a length of a total magnetic path of the magnetic core is $y/(k-1)$, wherein y is an inductance of the magnetic core reduced by the thin part, and k is the ratio of the sectional area of the thick part to the sectional area of the thin part.

* * * * *